(12) United States Patent
Eftekhari Far

(10) Patent No.: US 11,740,373 B2
(45) Date of Patent: Aug. 29, 2023

(54) ESTIMATION OF MECHANICAL PROPERTIES OF TRANSVERSELY ISOTROPIC MEDIA

(71) Applicant: Halliburton Energy Services, Inc., Houston, TX (US)

(72) Inventor: Mehdi Eftekhari Far, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/883,731

(22) Filed: Aug. 9, 2022

(65) Prior Publication Data

US 2022/0390638 A1 Dec. 8, 2022

Related U.S. Application Data

(63) Continuation of application No. 16/337,537, filed as application No. PCT/US2018/036136 on Jun. 5, 2018, now Pat. No. 11,448,789.

(Continued)

(51) Int. Cl.
*G01V 1/30* (2006.01)
*E21B 47/14* (2006.01)
(Continued)

(52) U.S. Cl.
CPC ............ *G01V 1/306* (2013.01); *E21B 25/00* (2013.01); *E21B 47/06* (2013.01); *E21B 47/14* (2013.01);
(Continued)

(58) Field of Classification Search
CPC .. G01V 1/306; G01V 1/50; G01V 2210/6242; G01V 2210/6248;
(Continued)

(56) References Cited

U.S. PATENT DOCUMENTS

| 8,175,807 | B2 | 5/2012 | Suarez-Rivera et al. |
| 9,784,876 | B2 | 10/2017 | Quirein et al. |
| | | (Continued) | |

FOREIGN PATENT DOCUMENTS

| WO | 2014000815 | | 1/2014 | |
| WO | WO-2014000815 | A1 * | 1/2014 | ............. G01V 1/306 |
| WO | 2016118360 | | 7/2016 | |

OTHER PUBLICATIONS

Hows et al., "Characterization of anisotropic dynamic mechanical rock properties in shale gas plays", 47th US Rock Mechanics / Geomechanics Symposium held in San Francisco, CA, USA, Jun. 23-26, 2013 (Year: 2013).*

(Continued)

*Primary Examiner* — Regis J Betsch
(74) *Attorney, Agent, or Firm* — John Wustenberg; C. Tumey Law Group PLLC

(57) ABSTRACT

Systems and methods for determining mechanical properties of anisotropic media are disclosed. A method for determining mechanical properties of an anisotropic media includes obtaining log data of the anisotropic media, the log data corresponding to measurements of the anisotropic media collected with a logging tool; determining values for a plurality of first stiffness components of a stiffness matrix based on horizontal and vertical velocities derived from the log data; determining an upper bound for a second stiffness component of the stiffness matrix based on the values for the plurality of first stiffness components; estimating a value for the second stiffness component based on the determined upper bound; determining a mechanical property of the anisotropic media based on the estimated value of the second stiffness component; and providing the determined mechanical property.

20 Claims, 10 Drawing Sheets

Related U.S. Application Data

(60) Provisional application No. 62/520,402, filed on Jun. 15, 2017.

(51) Int. Cl.
    *G01V 1/50*     (2006.01)
    *E21B 25/00*     (2006.01)
    *E21B 49/02*     (2006.01)
    *E21B 47/06*     (2012.01)

(52) U.S. Cl.
    CPC ............... *E21B 49/02* (2013.01); *G01V 1/50* (2013.01); *G01V 2210/626* (2013.01); *G01V 2210/6242* (2013.01); *G01V 2210/6248* (2013.01)

(58) Field of Classification Search
    CPC ... G01V 2210/626; E21B 47/06; E21B 47/14; E21B 49/02
    See application file for complete search history.

(56) References Cited

U.S. PATENT DOCUMENTS

| | | | |
|---|---|---|---|
| 2008/0178668 A1* | 7/2008 | Yan | G01V 1/40 702/11 |
| 2016/0131787 A1 | 5/2016 | Quirein et al. | |
| 2018/0196153 A1* | 7/2018 | Gu | G01V 1/50 |

OTHER PUBLICATIONS

Bayuk et al., "Upper and lower stiffness bounds for porous anisotropic rocks", Geophys. J. Int. (2008) 175, 1309-1320 (Year: 2008).*
"Characterization of Anisotropic Dynamic Mechanical Rock Properties in Shale Gas Plays" by Hows et al. In: 47th US Rock Mechanics/Geomechanics Symposium. American Rock Mechanics Association, 2013.
International Search Report and Written Opinion for Application No. PCT/US2018/036136 dated Sep. 11, 2018.
Quirein, J., Eid, M., and Cheng, A., 2014a, Predicting the Stiffness Tensor of a Transversely Isotropic Medium When the Vertical Poisson's Ratio is Less Than the Horizontal Poisson's Ratio. Paper OOOO Transactions, SPWLA 55th Annual Logging Symposium, Abu Dhabi, UAE, May 18-22.
Canady, W.J., 2011, January A Method for Full-Range Young's Modulus Correction. In North American Unconventional Gas Conference and Exhibition. Society of Petroleum Engineers.
Sarout, J., L. Molez, Y. Gueguen, N. Hoteit, 2007, Shale dynamic properties and anisotropy under triaxial loading Experimental and theoretical investigations: Physics and Chemistry of the Earth, 32, 896-906.
Sarout, J., Y. Gueguen, 2008, Anisotropy of elastic wave velocities in deformed shales: Part 1—Experimental results: Geophysics, 73, D75-D89.
Sarout, J., L. Esteban, C. Delle Piane, B. Maney, D.N. Dewhurst, 2014, Elastic anisotropy of Opalinus Clay under variable saturation and triaxial stress: Geophysical Journal International, 198, 1662-1682.
Sarout, J., C. Delle-Piane, D. Nadri, L. Esteban, and D.N. Dewhurst, 2015, A robust experimental determination of Thomsen's δ parameter: Geophysics, 80, A19-A24.
Sarout, J., 2017, Comment on "Physical constraints on c13 and δ for transversely isotropic hydrocarbon source rocks" by F. Yan, D.-H. Han and Q. Yao, Geophysical Prospecting, 57, 393-411: Geophysical Prospecting, 65, 379-380.
Yan, F., D.-H. Han, and Q. Yao, 2016, Physical constraints on c13 and δ for transversely isotropic hydrocarbon source rocks: Geophysical Prospecting, 64, 1524-1536.
Yan, F., D.-H. Han, and Q. Yao, 2013, Physical constraints on c13 and Thomsen parameter delta for VTI rocks: 83rd Annual International Meeting, SEG, Expanded Abstracts, 2889-2894.
Yan, F., D.-H. Han, and Q. Yao, 2014, Benchtop rotational group velocity measurement on shales: 84th Annual International Meeting, SEG, Expanded Abstracts, 2983-2987.
Yan, F., D.-H. Han, and Q. Yao, 2016b, Reply to Joel Sarout's comment on "Physical constraints on c13 and δ for transversely isotropic hydrocarbon source rocks": Geophysical Prospecting, Jul. 2016.
Yan, F., D.-H. Han, S. Sil, and X.-L. Chen, 2016c, Analysis of seismic anisotropy parameters for sedimentary strata: Geophysics, 81, D495-D502.
Yan, F., D.-H. Han, S. Sil, X. Chen, 2016d, Correlations between the seismic anisotropy parameters for shales: 86th Annual International Meeting, SEG Expanded Abstracts, 3190-3194.
Schoenberg, M. and F. Muir, 1989, A calculus for finely layered anisotropic media. Geophysics 54, 581-589. Sone, H., 2012, Mechanical Properties of Shale Gas Reservoir Rocks and Its Relation to the In-Situ Stress Variation Observed in Shale Gas Reservoirs, Stanford University unpublished PhD dissertation.
Schoenberg, M., Muir F. and Sayers, C. 1996. Introducing Annie: A Simple Three Parameter Anisotropic Velocity Model for Shales: Journal of Seismic Exploration, 5:35-49.
Morales, R.H. and Marcinew, R.P., Jan. 1993. Fracturing of high-permeability formations: Mechanical properties correlations. In SPE Annual Technical Conference and Exhibition Society of Petroleum Engineers.
Sone, H., 2012, Mechanical Properties of Shale Gas Reservoir Rocks and Its Relation to the In-Situ Stress Variation Observed in Shale Gas Reservoirs, Stanford University PhD dissertation.

* cited by examiner

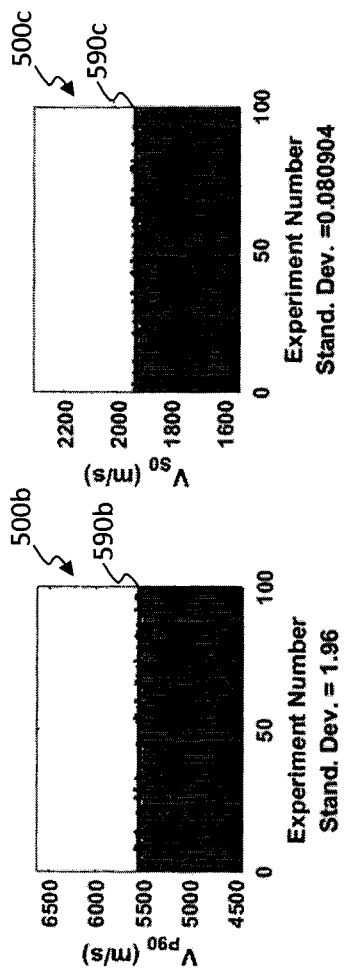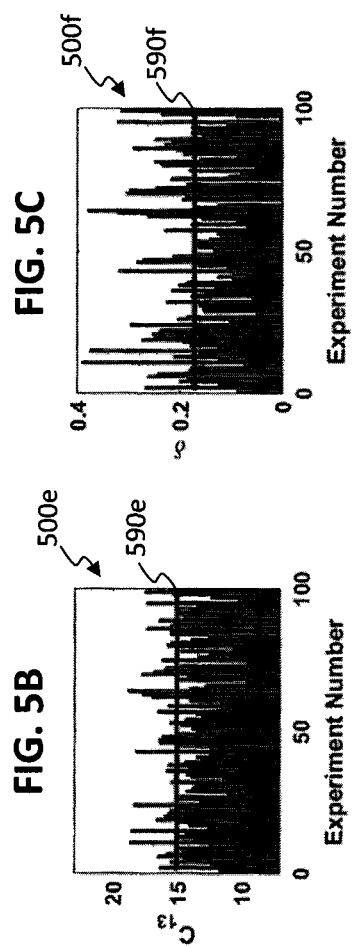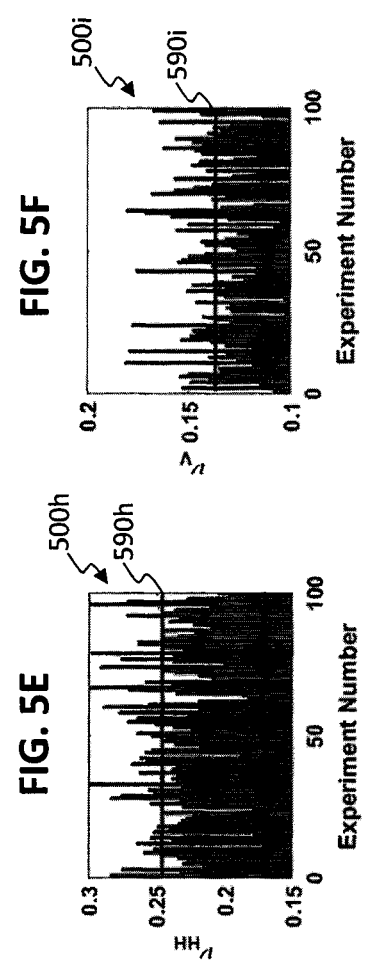
FIG. 5A FIG. 5B FIG. 5C FIG. 5D FIG. 5E FIG. 5F FIG. 5G FIG. 5H FIG. 5I

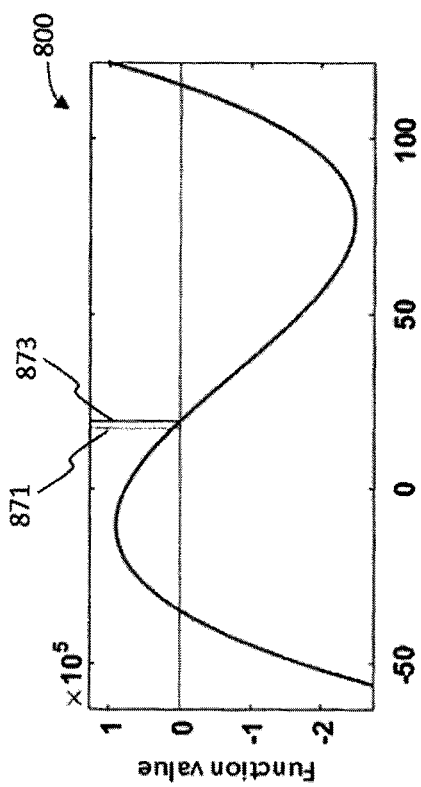
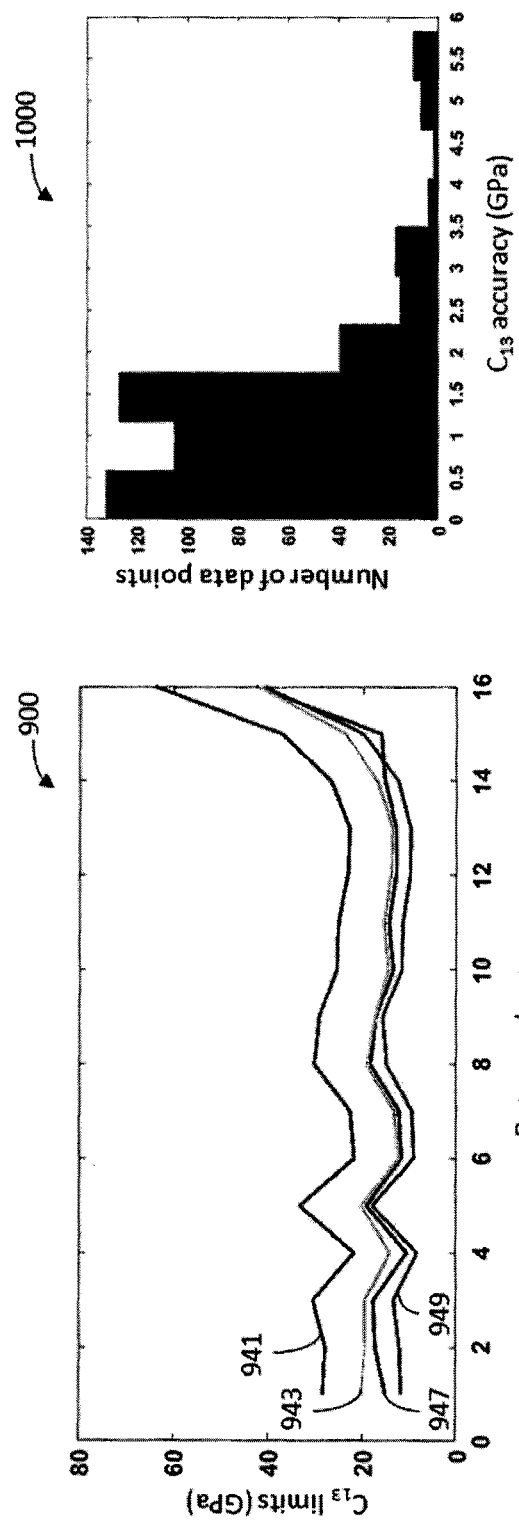
FIG. 8
FIG. 9
FIG. 10

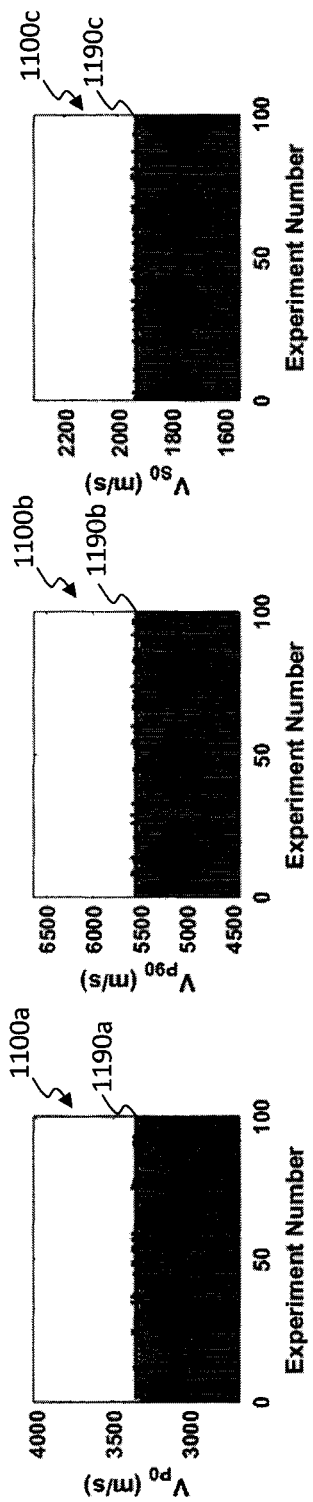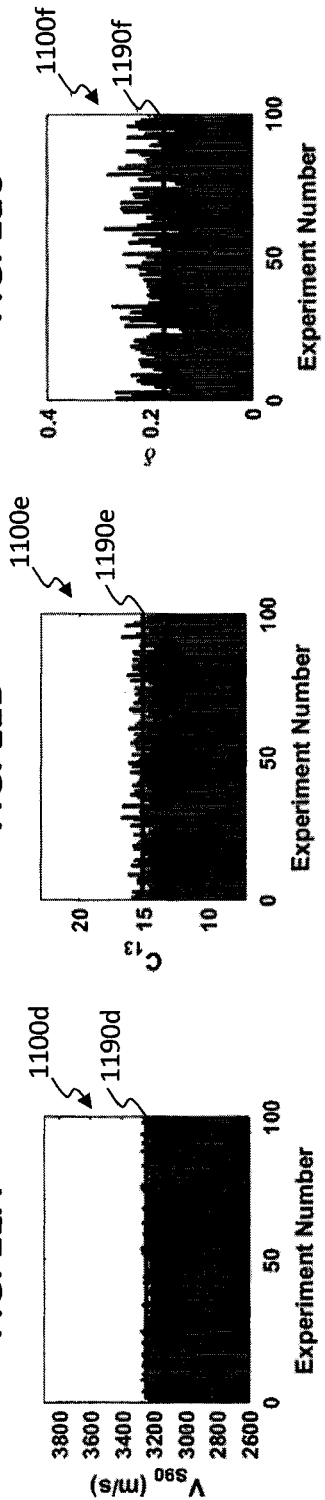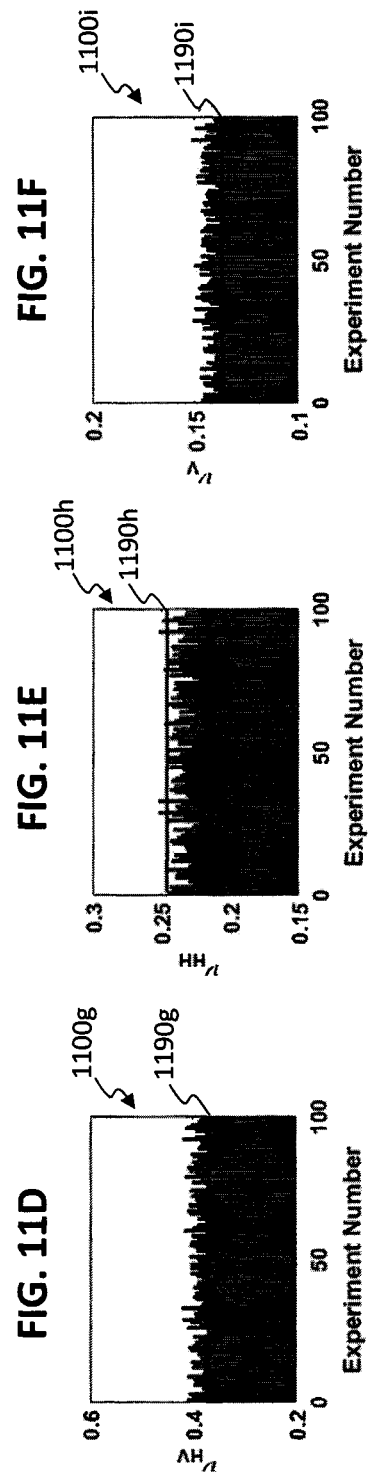

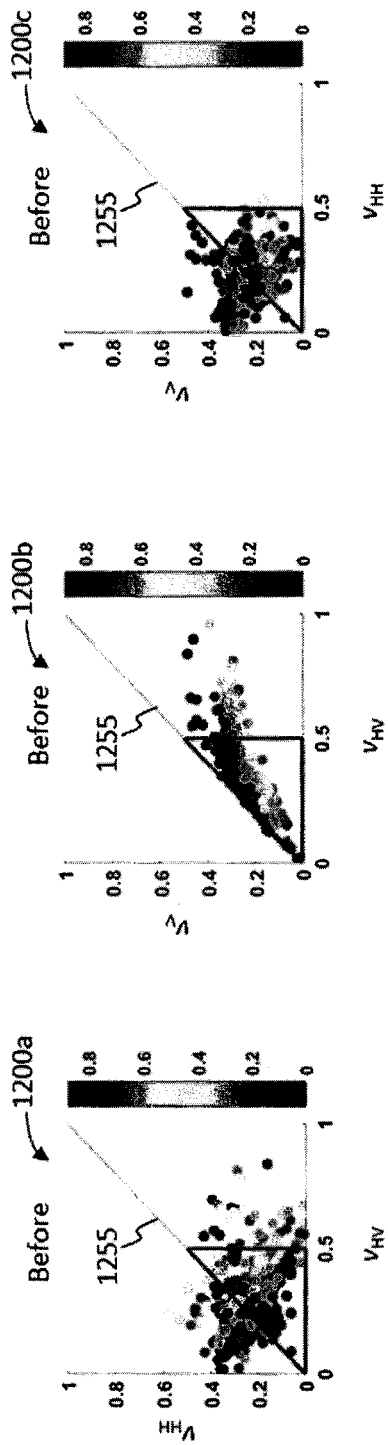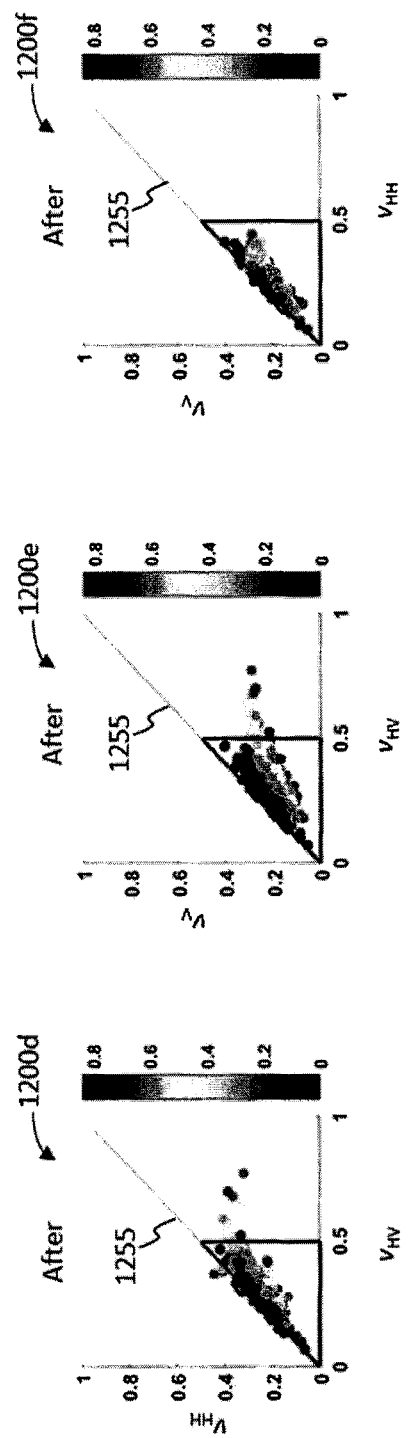
FIG. 12A  FIG. 12B  FIG. 12C
FIG. 12D  FIG. 12E  FIG. 12F

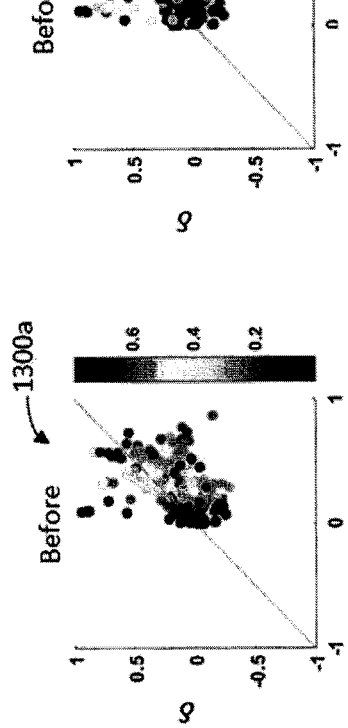
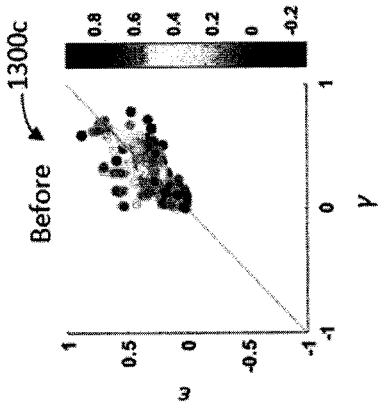
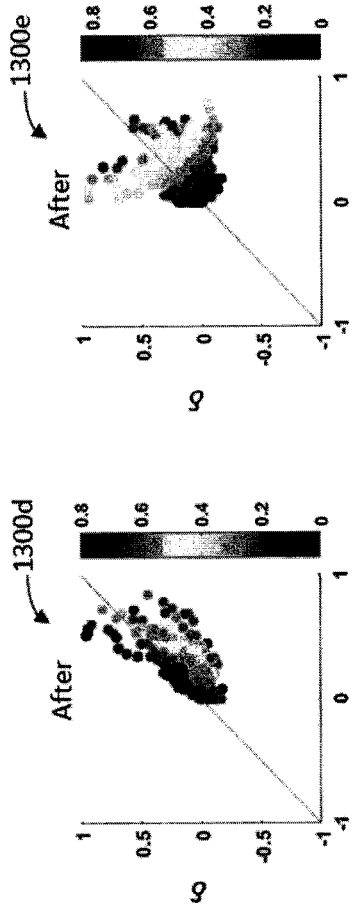
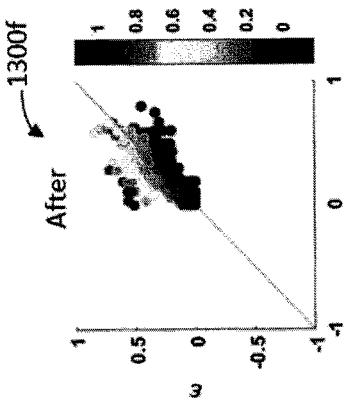
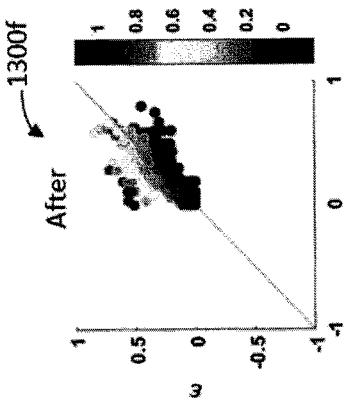
FIG. 13A FIG. 13B FIG. 13C FIG. 13D FIG. 13E FIG. 13F

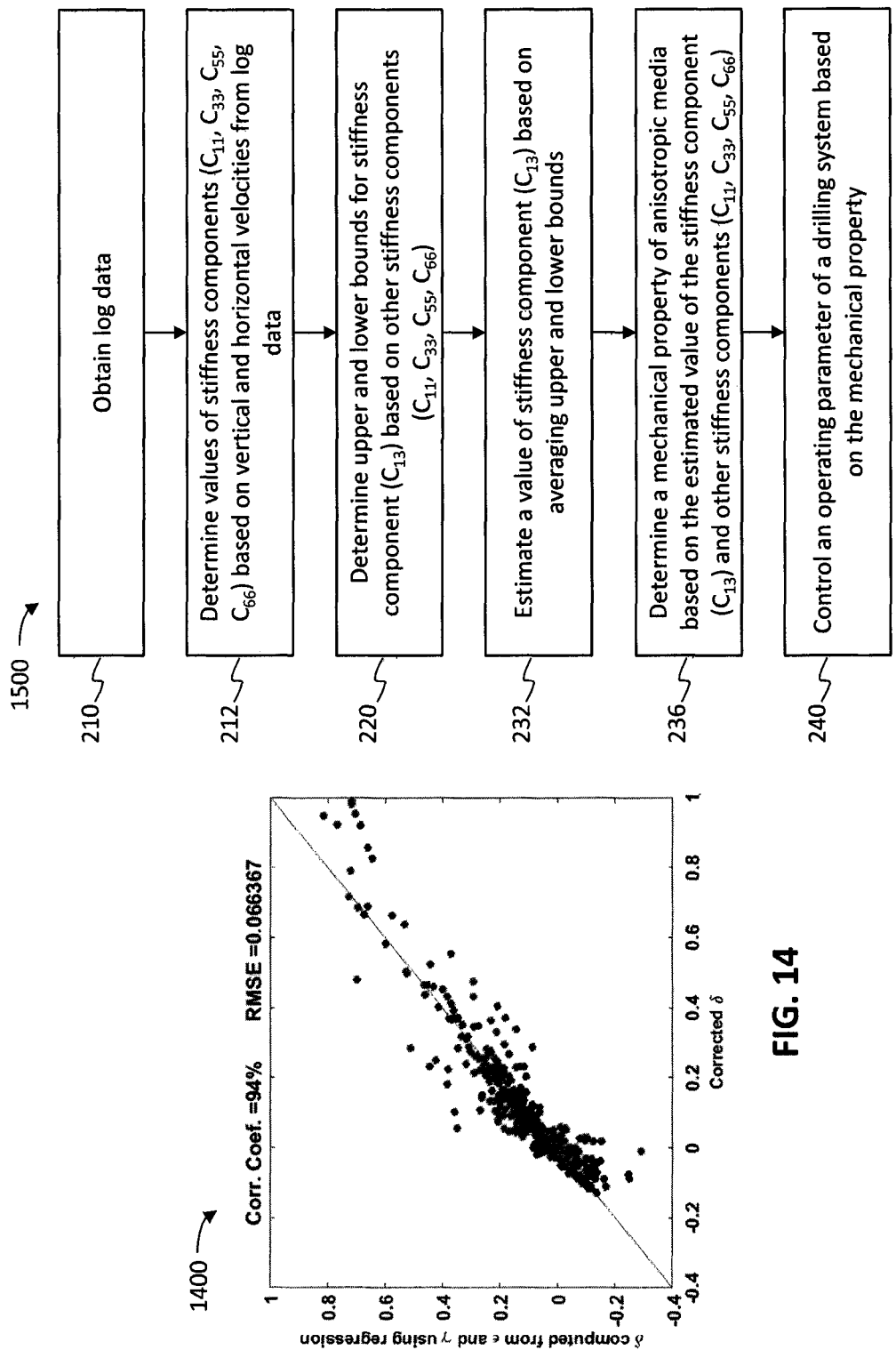

ESTIMATION OF MECHANICAL PROPERTIES OF TRANSVERSELY ISOTROPIC MEDIA

TECHNICAL FIELD

The present description relates in general to determining mechanical properties, and more particularly, for example, without limitation, to systems and methods for oil and gas extraction involving determining mechanical properties of anisotropic media based on measurements of a formation.

BACKGROUND OF THE DISCLOSURE

Polar anisotropic media, which is commonly referred to as transversely isotropic (TI) media, has an infinite-fold axis of rotation and an infinite set of two-fold axes perpendicular to it. A symmetry plane exists perpendicular to the infinite-fold axis. These types of media are known as Transversely Isotropic (TI), with alternative names such as vertically transverse isotropic (VTI), horizontally transverse isotropic (HTI), and tilted transverse isotropic (TTI). VTI is a convenient model for describing unfractured layered media and in particular shales. Shale formations comprise about 75% of the sedimentary basins, and this makes VTI the most common anisotropic model in exploration seismology. Shales play an important role in fluid flow and seismic imaging because of their low permeability and anisotropic properties.

A TI stiffness tensor contains five independent elastic constants and provides useful information to aid in various well operations, such determining locations to drill a horizontal well or identifying intervals to perforate. Unfortunately, using conventional methods the full stiffness tensor is difficult to obtain reliably or may require measurements that are not available at all depths in a well.

BRIEF DESCRIPTION OF THE DRAWINGS

FIGS. 5A-5I are graphs depicting exemplary input data and resulting errors.

FIG. 8 is a graph depicting an exemplary plot as a function of $C_{13}$.

FIG. 9 is a graph depicting exemplary upper and lower bounds.

FIG. 10 is a graph depicting exemplary accuracies of estimating $C_{13}$.

FIGS. 11A-11I are graphs depicting exemplary input data and resulting errors.

FIG. 12A-12F are graphs depicting exemplary Poisson's ratios.

FIG. 13A-13F are graphs depicting exemplary Thomson's parameters.

FIG. 14 is a graph depicting an exemplary estimation of $\delta$ using a regression analysis.

FIG. 15 is a flow diagram depicting an exemplary method for computing mechanical properties of an anisotropic media.

Figure 2:
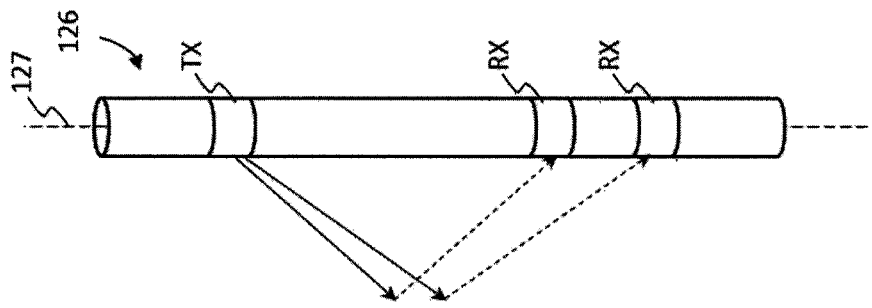
FIG. 2 is a schematic diagram of an exemplary logging tool that may employ principles of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present description relates in general to determining mechanical properties and more particularly, for example, without limitation, to systems and methods for oil and gas extraction involving determining mechanical properties of anisotropic media, such as transversely isotropic, orthotropic and/or orthorhombic media, based on measurements of a formation.

Systems and Methods for Determining Mechanical Properties of Anisotropic Media

Principles of this disclosure may be employed, for example, in various types of well systems, such as drilling systems, completion systems, and wireline systems for wells that may be useful for extraction of oil and/or gas. FIG. 1A is a schematic diagram of an exemplary drilling system 100 that may employ the principles of the present disclosure, according to one or more embodiments. As illustrated, the drilling system 100 may include a drilling platform 102 positioned at the Earth's surface and a wellbore 104 that extends from the drilling platform 102 into one or more subterranean formations 106. In other embodiments, such as in an offshore or subsea drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of well-related parameters, such as drilling conditions, formation properties, and the like. The MWD and LWD tools may include at least one logging tool 126, which may comprise one or more sensors having a plurality of sensing elements capable of collecting measurements or log data useful for determining wellbore parameters, including mechanical properties of the formation. In some embodiments, the logging tool 126 is implemented as or otherwise includes a sonic logging tool having one or more acoustic transmitters and/or one or more acoustic receivers configured to measure and collect data that can be analyzed to deliver desired elastic wave velocity measurements of an anisotropic media in the formation 106. As used herein, a "sonic logging tool" refers to any logging tool configured to collect elastic waveform data based on acoustics, which can be in audible and/or inaudible frequencies. The transmitters and/or receivers may be configured to transmit and/or receive waves propagating in multiple different directions (e.g., vertical, horizontal, and/or off-axis) and/or propagating with multiple different modes (e.g., monopole, dipole, quadrupole). Analysis of the different modes using standard methods can deliver the desired elastic wave measurements, such as compressional and shear velocities through the formation of interest.

As the drill bit 118 extends the wellbore 104 through the formations 106, the logging tool 126 may collect measurements that can be used to estimate mechanical properties of the formations 106. The logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In some embodiments, the telemetry module 128 may be omitted and the drill string 112 may instead comprise wired drill pipe or wired coiled tubing used to transfer data via wired conductors to a surface receiver. In certain embodiments, some or all of the measurements taken by the logging tool 126 may be stored within the logging tool 126 or the telemetry module 128 for later retrieval at the surface upon retracting the drill string 112.

Figure 1B:
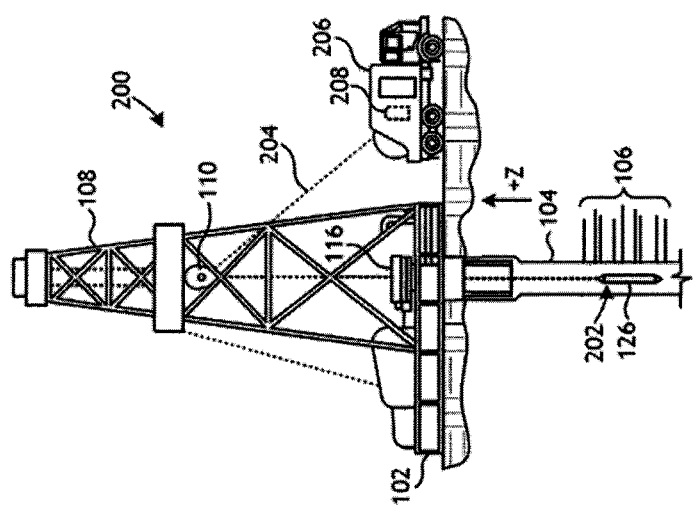
FIG. 1B is a schematic diagram of an exemplary wireline system that may employ the principles of the present disclosure.
Figure 1A:
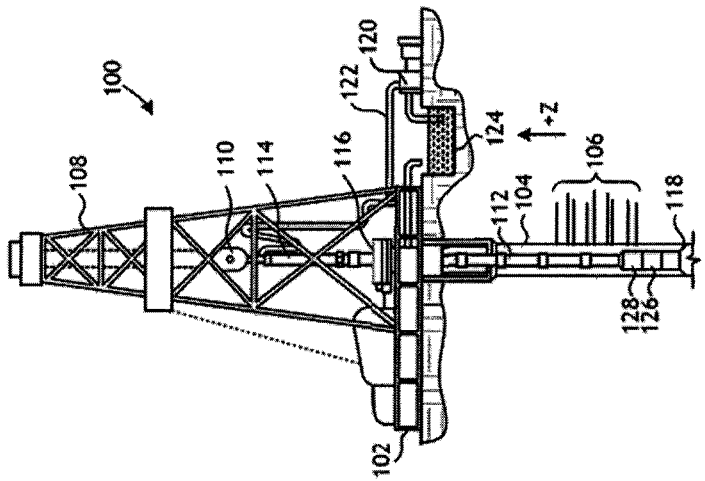
FIG. 1A is a schematic diagram of an exemplary drilling system that may employ the principles of the present disclosure.

At various times during the drilling process, the drill string 112 may be removed from the wellbore 104, as shown in FIG. 1B, to conduct measurement/logging operations. More particularly, FIG. 1B depicts a schematic diagram of an exemplary wireline system 200 that may employ the principles of the present disclosure, according to one or more embodiments. Like numerals used in FIGS. 1A and 1B refer to the same components or elements and, therefore, may not be described again in detail. As illustrated, the wireline system 200 may include a wireline instrument sonde 202 that may be suspended into the wellbore 104 by a conveyance 204. While the conveyance 204 is depicted as a cable in FIG. 1B, in various embodiments a conveyance may include, for example, a wireline, slickline, drill pipe, coiled tubing, downhole tractor, or a combination thereof. The wireline instrument sonde 202 may include the logging tool 126, which may be communicably coupled to the conveyance 204. In various embodiments the conveyance 204 may or may not convey telemetry and/or power. For example, the conveyance 204 may include conductors for transporting power to the wireline instrument sonde 202 and also facilitate communication between the surface and the wireline instrument sonde 202. A logging facility 206, shown in FIG. 1B as a truck, may collect measurements from the logging tool 126, and may include computing facilities 208 for controlling, processing, storing, and/or visualizing the measurements gathered by the logging tool 126. The computing facilities 208 may be communicably coupled to the logging tool 126 by way of the conveyance 204.

While computing facilities 208 are shown uphole in FIG. 1B, in various embodiments of the present disclosure, methods described herein may be implemented uphole, downhole, or both. For example, a processing system including one or more processors and/or memories configured to implement any of the methods for computing mechanical properties described herein may be disposed downhole in the wellbore 104 (e.g., in the logging tool 126 or instrument sonde 202), uphole in the logging facility 206, or a combination thereof may be configured to implement these methods using distributed processing techniques.

FIG. 2 is a schematic diagram depicting an exemplary logging tool 126 in more detail, according to some embodiments. The logging tool 126 shown in FIG. 2 generally comprises one or more transmitters TX and one or more receivers RX. The transmitters TX are generally configured to transmit waves in an anisotropic media of interest, e.g., formation 106 (see FIGS. 1A-1B), while the receivers RX are generally configured to measure a corresponding response to the transmitted waves after the waves interact with the media of interest. By way of example, the transmitter(s) TX may include one or more acoustic transmitters (e.g., piezoelectric transmitters) that act as a source of audible and/or inaudible sounds to generate elastic waves in the anisotropic media, and the receiver(s) RX may include one or more acoustic receivers (e.g., piezoelectric receivers) that capture returned waves transmitted by the acoustic transmitter(s). In some embodiments, the transmitters TX include a plurality of transmitters of two or more different types (e.g., selected from monopole transmitters, dipole transmitters, and quadrupole transmitters) to permit determination of various different velocities disclosed herein. Although only one transmitter TX is shown in FIG. 2, in various embodiments the logging tool 126 may include any suitable number of transmitters. For example, the logging tool 126 may include two, three, four, five, or more transmitters. Although only two receivers RX are shown in FIG. 2, in various embodiments the logging tool 126 may include any suitable number of receivers. For example, the logging tool 126 may include two, three, four, five, or more receivers.

As shown in FIG. 2, the logging tool 126 may be generally shaped as an elongated component defining a longitudinal axis 127, which can be disposed downhole in a wellbore 104 (see FIGS. 1A-1B). The transmitter(s) TX are generally spaced apart axially along the longitudinal axis relative to the receivers RX to permit capture of the desired data. In the illustrated example, multiple receivers are included, which are also spaced apart axially relative to each other, to permit capture of time delay information from the transmitted waves.

In certain embodiments, data from the logging tool 126 can be utilized to predict mechanical properties of the formation. Predicting the correct values of Poisson's ratios (v) and Young's moduli (E), which may be used for computing fracture gradient and minimum horizontal stress, is useful for geomechanics, hydraulic fracturing and completion. Minimum horizontal stress is useful for selecting where to stage and perforate. With improved predictions of elastic moduli, minimum and maximum horizontal stress can be better evaluated. A profile of stress vs. depth combined with rock brittleness predicted from the elastic moduli profiles is useful to aid in selecting "sweet spots" to drill a horizontal well, and also to determine intervals to perforate.

In certain embodiments, a method is proposed for accurate computing of Young's moduli, Poisson's ratio and other mechanical and seismic properties of media with layering (or lamination or bedding, or fractures). In certain embodiments, methods described herein allow for highly accurate estimations while reducing the number of inputs, which may be challenging to get even from core measurements. In certain applications, cores are not acquired at all depths; therefore, there is a need for a method that is less affected by lack of core data.

Conventional approaches of computing these properties use measurements at 0, 90 and 45 degree angles (the third one might also be an arbitrary off-axis angle, between 0 and 90) with respect to the symmetry axis of the media. In certain embodiments, methods described herein do not require 45-degree measurements (or other off-axis measurements).

Characterization of elastic properties of VTI media has been of great interest for the past three decades for many applications such as seismic imaging, drilling, and completion geomechanics. Although there has been a good progress in considering TI models for seismic applications, these models are still poorly understood for other applications such as geomechanics. For geomechanics and drilling applications, idealized assumptions for TI models such as homogeneity, elasticity, and scale dependency are violated more than seismic applications. For seismic applications, many of these problems are less significant, partly because of the larger seismic wavelengths which can ignore small-scale heterogeneities and partly because the rocks remain in the elastic range, unlike geomechanics applications.

In considering TI models, according to at least some embodiments disclosed herein the so-called dynamic mechanical properties (e.g., Young's moduli and Poisson's ratios) derived from wave velocity measurements in the rocks can be related to the static mechanical properties, which are more relevant to engineering applications. This can be referred to as the dynamic-static correction problem. Ignoring anisotropy due to lamination and fine layering (VTI) can cause significant errors and problems in understanding the true relationship between the dynamic and static properties. This problem seems to be more severe for Poisson's ratios because it is defined as a fraction and the dynamic values obtained can be a lot different from the true values. As described herein, small uncertainties in measured velocities can lead to very large errors in computing Poisson's ratios.

In certain embodiments, ignoring the VTI model for rocks that actually have VTI symmetry will affect the dynamic-static property investigation. There is a significant difference between VTI and isotropic mechanical properties, which might have prevented prior observation of any meaningful relationship for Poisson's ratios (and perhaps Young's moduli). The only property that seems to be less affected by ignoring VTI is the estimation of the Young's Modulus EV, which seems to be close to what would be observed by isotropic assumption.

The concept of Poisson's ratio (isotropic definition and typically computed from wave velocities) has been a controversial topic in geophysics, with some suggesting that it should not be used for geophysical applications because it is computed using velocities whereas the true value of Poisson's ratio should be measured by actual mechanical loading and using strain gauges. However, Poisson's ratio can be a useful tool for characterizing rock mechanical properties through brittleness, for example. In certain embodiments, careful measurement of the dynamic Poisson's ratios can preserve the relative relationships between VTI Poisson's ratios and even provide dynamic results that are close to the static measurements. An assumption here is that different effects such as dispersion and elasticity assumption will be cancelled out when computing Poisson's ratios.

According to some embodiments, using the relationships that should hold for Poisson's ratios in VTI media, a range of variation for $C_{13}$ can be defined. The bounds for $C_{13}$ happen to be relatively narrow for many rock samples. For measurements where the relationships between VTI Poisson's ratios are violated, this may be attributed to errors in $C_{13}$ because the other four VTI stiffness matrix components are measured directly whereas $C_{13}$ is computed from the other velocities and involves 45° measurements. As described herein, $C_{13}$ is highly sensitive to errors in other velocities especially the 45° velocity measurements.

Thomsen's notation and parameters $\varepsilon$, $\gamma$, and $\delta$ have been used for many applications, because of their simplicity. Thomsen's notation and parameters are described, for example, in Thomsen, L., 1986, "Weak Elastic Anisotropy," Geophysics 51(10), 1954-1966. Although it is widely accepted that $\varepsilon$ and $\gamma$ are closely related ($\gamma$ in many cases slightly higher than $\varepsilon$), there has not been any meaningful relationship between $\delta$ and the other two parameters. As described herein, this ambiguity is because of the complications in measuring off-axis velocities (and subsequently $C_{13}$) used for computing $\delta$ and also because of the complicated definition of $\delta$ itself. If $C_{13}$ is computed accurately, $\delta$ seems to have a meaningful relationship to $\varepsilon$ and $\gamma$.

Theory

Linear elasticity can describe the behavior of a variety of materials, such as the media composing shales and other formations. The stress-strain relationships for a three-dimensional linear elastic material are complex as the material may be subjected to a variety of different compressive and shear stresses in different directions about any given point.

Generalized Hooke's Law captures this complexity by modeling stress ($\sigma$) and the strain ($\varepsilon$) as second-order tensors ($\sigma_{ij}$, $\varepsilon_{ij}$) wherein each component of stress depends linearly on every component of strain. The relationship between stress and strain is characterized by a material constant referred to as stiffness (C) that can be represented by a fourth-order tensor $C_{ijkl}$ that defines the linear mapping between the two second-order tensors corresponding to stress and strain ($\sigma_{ij}=C_{ijkl}\varepsilon_{ij}$). It is noted that the inverse of the stiffness is called the compliance (S), and it should be understood that any computation of compliance can generally be considered equivalent to computing stiffness for purposes of this description.

Mathematically, the stress and strain tensors can be represented in a Cartesian coordinate system as follows, where subscripts 1, 2, 3 correspond to the three axes in the coordinate system (e.g., x=1, y=2, z=3):

$$\sigma_{ij} = \begin{bmatrix} \sigma_{11} & \sigma_{12} & \sigma_{13} \\ \sigma_{21} & \sigma_{22} & \sigma_{23} \\ \sigma_{31} & \sigma_{32} & \sigma_{33} \end{bmatrix}; \quad (1)$$

-continued $$\varepsilon_{ij} = \begin{bmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{bmatrix}$$

As a mapping between two 3 by 3 matrices, the stiffness tensor $C_{ijkl}$ can be represented as a 3 by 3 by 3 by 3 matrix having 81 components. Inherent symmetries of these mechanical properties allow these equations and relationships to be simplified considerably. Voigt notation provides a standard mapping for tensor indices and allows the symmetric tensors for stress, strain, and stiffness to be reduced to two first order tensors and a second order tensor, respectively. This mapping is shown in the following equation, which omits redundant stress and strain tensor components due to symmetry ($\sigma_{23}=\sigma_{32}$, $\varepsilon_{13}=\varepsilon_{31}$, ... ):

$$\begin{bmatrix} \sigma_1 = \sigma_{11} \\ \sigma_2 = \sigma_{22} \\ \sigma_3 = \sigma_{33} \\ \sigma_4 = \sigma_{23} \\ \sigma_5 = \sigma_{13} \\ \sigma_6 = \sigma_{12} \end{bmatrix} = \begin{bmatrix} C_{11} & C_{12} & C_{13} & C_{14} & C_{15} & C_{16} \\ C_{21} & C_{22} & C_{23} & C_{24} & C_{25} & C_{26} \\ C_{31} & C_{32} & C_{33} & C_{34} & C_{35} & C_{36} \\ C_{41} & C_{42} & C_{43} & C_{44} & C_{45} & C_{46} \\ C_{51} & C_{52} & C_{53} & C_{54} & C_{55} & C_{56} \\ C_{61} & C_{62} & C_{63} & C_{64} & C_{65} & C_{66} \end{bmatrix} \begin{bmatrix} \varepsilon_1 = \varepsilon_{11} \\ \varepsilon_2 = \varepsilon_{22} \\ \varepsilon_3 = \varepsilon_{33} \\ \varepsilon_4 = \varepsilon_{23} \\ \varepsilon_5 = \varepsilon_{13} \\ \varepsilon_6 = \varepsilon_{12} \end{bmatrix} \quad (2)$$

36 components are shown for the stiffness matrix above, which are sometimes referred to as stiffness coefficients or elastic constants. While 36 stiffness components are shown, symmetry of the stiffness matrix means only 21 of these components are independent for the most general case of anisotropic elasticity.

The stiffness matrix can be further simplified for a variety of types of isotropy and anisotropy. For example, for isotropic media the stiffness matrix can be reduced to only two independent components corresponding to changes in volume and shearing deformations. For various types of anisotropy (transverse isotropic, orthotropic, orthorhombic, and others), the stiffness matrix can be simplified to fewer than 21 independent components.

Polar anisotropic media, which is commonly referred to as transversely isotropic (TI) media, has an infinite-fold axis of rotation and an infinite set of two-fold axes perpendicular to it. A symmetry plane exists perpendicular to the infinite-fold axis. These types of media are known as Transversely Isotropic (TI), with alternative names such as vertically transverse isotropic (VTI), horizontally transverse isotropic (HTI), and tilted transverse isotropic (TTI).

Figure 3:
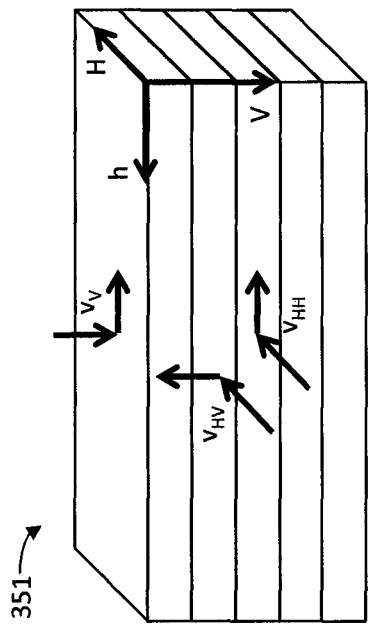
FIG. 3 is a schematic diagram depicting an example of polar anisotropy symmetry.

FIG. 3 shows an example of TI media 351 where the infinite-fold axis of rotation corresponds to the symmetry axis 353 and extends in a vertical direction, perpendicular to the direction of layering 355 of the media. A TI stiffness tensor contains five independent elastic constants. VTI is a convenient model for describing unfractured layered media and in particular shales. Shale formations comprise about 75% of the sedimentary basins, and this makes VTI the most common anisotropic model in exploration seismology. Shales play an important role in fluid flow and seismic imaging because of their low permeability and anisotropic properties. It will be appreciated that while examples are described herein with reference to VTI media, principles of this disclosure can be extended to various other types of media, as appropriate.

The stiffness matrix for VTI media in a coordinate system where $x_1$ and $x_2$ directions are in a horizontal plane and $x_3$ is in the vertical direction (see FIG. 3) has the form:

$$C_{VTI} = \begin{bmatrix} C_{11} & C_{11}-2C_{66} & C_{13} & 0 & 0 & 0 \\ C_{11}-2C_{66} & C_{11} & C_{13} & 0 & 0 & 0 \\ C_{13} & C_{13} & C_{33} & 0 & 0 & 0 \\ 0 & 0 & 0 & C_{55} & 0 & 0 \\ 0 & 0 & 0 & 0 & C_{55} & 0 \\ 0 & 0 & 0 & 0 & 0 & C_{66} \end{bmatrix} \quad (3)$$

VTI stiffness matrix components, $C_{11}$, $C_{33}$, $C_{55}$ and $C_{66}$ can be defined in terms of vertical and horizontal compressional and shear velocities. Note that $C_{44}=C_{55}$ for VTI media, and thus the above matrix can equivalently be expressed using $C_{44}$. $C_{13}$, on the other hand typically requires off-axes velocity measurements. For simplicity, the 45° compressional wave velocity can be used in equation (4) to compute $C_{13}$.

$$C_{13} = \sqrt{(2\rho V_{P45}^2 - C_{11} - C_{55})(2\rho V_{P45}^2 - C_{33} - C_{55})} - C_{55} \quad (4)$$

Thomsen parameters are also defined in terms of $C_{ij}$:

$$\varepsilon = \frac{C_{11} - C_{33}}{2C_{33}} \quad (5)$$

$$\gamma = \frac{C_{66} - C_{55}}{2C_{55}} \quad (6)$$

$$\delta = \frac{(C_{13} + C_{55})^2 - (C_{33} - C_{55})^2}{2C_{33}(C_{33} - C_{55})} \quad (7)$$

Anisotropic Poisson's ratios ($v_{ij}$) for VTI media are defined by the following general equation:

$$v_{ij} = -\frac{\varepsilon_j}{\varepsilon_i} \quad (8)$$

Replacing axes labeling of 1,2 with H,h and 3 with V, the axes define:

$$v_V = -\frac{\varepsilon_H}{\varepsilon_V} \quad (9)$$

$$v_{HH} = -\frac{\varepsilon_H}{\varepsilon_h} \quad (10)$$

$$v_{HV} = -\frac{\varepsilon_V}{\varepsilon_H} \quad (11)$$

Figure 4:
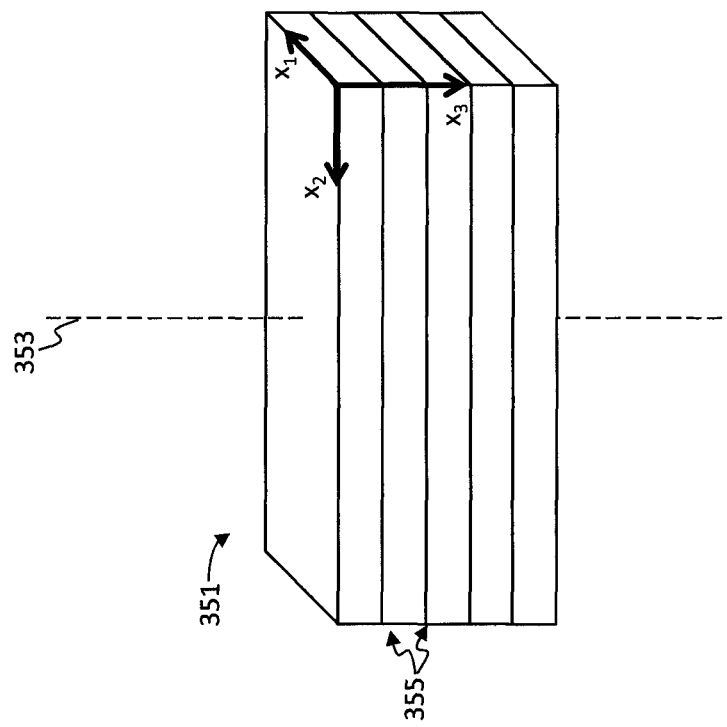
FIG. 4 is a schematic diagram depicting exemplary Poisson's ratios.

The three Poisson's ratios in a VTI medium are shown in FIG. 4 where in each case the first arrow shows the direction of applied stress and the consequent arrow shows the direction of expansion, orthogonal to the applied stress. Note that in $v_{HH}$ case, $\varepsilon_h$ is used to distinguish 1 and 2 direction because the horizontal strain values are different when evaluating $v_{HH}$, otherwise one would get $v_{HH}=1$ which is not correct.

In terms of $C_{ij}$, VTI Poisson's ratios as well as vertical Young's modulus ($E_V$) and horizontal Young's modulus ($\varepsilon_H$) are, $$v_{HV} = \frac{2C_{13}C_{66}}{C_{11}C_{33} - C_{13}^2} \quad (12)$$

$$v_{HH} = \frac{C_{33}(C_{11} - 2C_{66}) - C_{13}^2}{C_{11}C_{33} - C_{13}^2} \quad (13)$$

$$v_V = \frac{C_{13}}{2(C_{11} - C_{66})} \quad (14)$$

$$E_V = \frac{C_{33}(C_{11} - C_{66}) - C_{13}^2}{C_{11} - C_{66}} \quad (15)$$

$$E_H = \frac{4C_{66}(C_{33}(C_{11} - C_{66}) - C_{13}^2)}{C_{11}C_{33} - C_{13}^2} \quad (16)$$

As seen in above equations, $C_{13}$ goes into computation of all of these mechanical properties as well as Thomsen parameter $\delta$. Therefore uncertainties in $C_{13}$ will affect all of these properties. Computing $C_{13}$ using equation (4) is highly sensitive to uncertainties in velocities, especially to 45° velocity.

Referring to FIGS. 5A-5I, a simple Monte Carlo simulation reveals the effects of small errors in velocity measurements for computing $C_{13}$, $\delta$, and Poisson's ratios. FIGS. 5A-5I show exemplary graphs 500a-500i to demonstrate sensitivities based on measurements from a set of data for one rock sample. The graphs 500a-500i depict an example of how parameters and mechanical properties are sensitive to variations or inaccuracies in velocities. The graphs 500a-500i shown in FIGS. 5A-5I depict results of an experiment performed using data from one rock sample, but it should be noted that this experiment was repeated for many other rock samples and the same observations were seen for all the experiments.

The graphs 500a-d shown in FIGS. 5A-5D contain bar plots based on four measured velocity values for the sample, respectively (i.e., compressional vertical velocity Vp0=3350 m/s, compressional horizontal velocity Vp90=5533 m/s, compressional 45 degree velocity Vp45=4360 m/s, and horizontal shear velocity Vs90=3246 m/s). Horizontal bars 590a-d show these measured velocity values. 100 noisy values were generated for each velocity, with added maximum noise equal to 1% of each velocity magnitude. These values are shown as vertical bars in FIGS. 5A-5D and were taken as inputs for the analysis.

In FIGS. 5E-5I, equations (4, 7, 12, 13 and 14) were used to compute $C_{13}$, $\delta$ and VTI Poisson's ratios for each of the 100 permutations. The results of these computations are plotted in graphs 500e-i. In FIG. 5E, graph 500e depicts the computed $C_{13}$ values from each permutation as vertical bars and depicts the expected $C_{13}$ value as horizontal bar 590e. The results are similarly depicted in FIGS. 5F-5I in graphs 500f-i for $\delta$ and VTI Poisson's ratios. In FIG. 5F, graph 500f depicts the computed $\delta$ values from each permutation as vertical bars and depicts the true $\delta$ value as horizontal bar 590f. In FIG. 5G-5I, graphs 500g-i depict the computed $v_{HV}$, $v_{HH}$, and $v_V$ values from each permutation as vertical bars and depicts the true $v_{HV}$, $v_{HH}$, and $v_V$ values as horizontal bars 590g-i, respectively.

As shown in FIG. 5E, even a small error of maximum 1% can lead to $C_{13}$ values that are 10 gigapascals (GPa) different. The difference for $\delta$ can be as high as 0.5 (see FIG. 5F), and about 0.3 for Poisson's ratios (see FIGS. 5G-5I). The same amount of errors as $C_{13}$ can be seen for dynamic Young's moduli (not shown). These differences can lead to completely different results and conclusions about rock's elastic properties. In certain applications, the 45° measurements are the main cause of errors in estimating $C_{13}$, and as a result, $\delta$ and VTI mechanical properties.

FIGS. 6A-6D depict an example of how parameters are sensitive to different velocities. In particular, FIGS. 6A-6D show graphs 600a-d containing exemplary results of a sensitivity analysis demonstrating how errors in off-axis velocity Vp45 can have a greater effect on $C_{13}$ values compared to other velocities.

In this example, ultrasonic data measured on about 450 rock samples was used for the analysis. A range of variation for velocities was defined for each sample. The range of variation for the $i^{th}$ sample was [$V^i$–600 to $V^i$+600] meters per second (m/s). In particular, for each velocity measurement, 1201 values were generated where the middle value in the generated array was the measured value from the data. The vertical axis shows the rock sample number for the dataset that was used. There are about 450 rock samples (hence, the vertical axis goes from one to about 450). Going along a horizontal line from left to right, the first value is $V^i$–600 m/s and the last value seen is $V^i$+600 m/s. The measured values for the velocities are shown by the white curve that passes through the middle of each cloud.

Figure 6A:
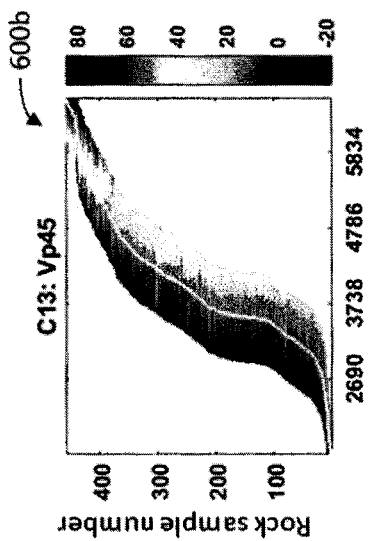
FIGS. 6A-6D are graphs depicting exemplary sensitivities of $C_{13}$ to different velocities.
Figure 6B:
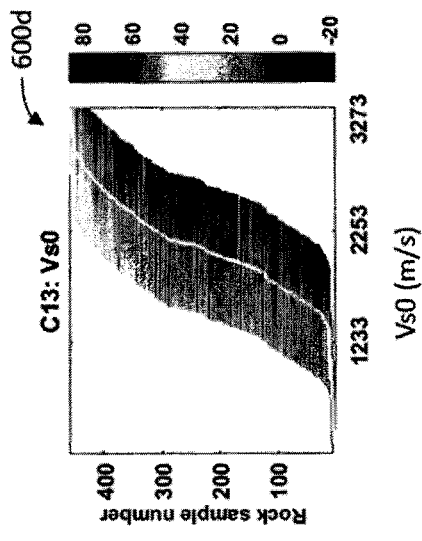
Figure 6C:
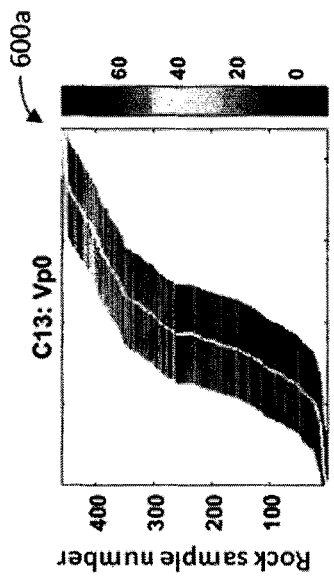
Figure 6D:
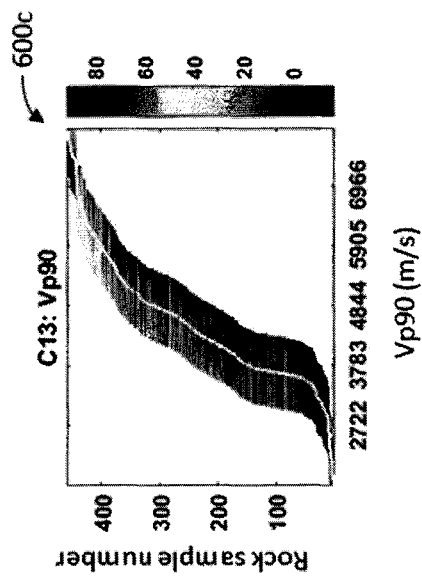

Referring to graph 600a shown in FIG. 6A, to see the effect of Vp0 on $C_{13}$ in this example, $C_{13}$ was computed using equation (4) by varying Vp0 for each sample in the [$V^i$p0–600 to $V^i$p0+600] range, while using only the measured values for the rest of velocities ($V^i$p90, Vp45 and Vs90) for the $i^{th}$ sample (where i is the rock sample number). This was repeated for graphs 600b (FIG. 6B), 600c (FIG. 6C), and 600d (FIG. 6D) to compute the sensitives of $C_{13}$ to $V^i$p90, Vp45 and Vs90, respectively, in each case defining a range of variation for the given velocity while keeping the other velocities unchanged. In order to be able to see meaningful trends, for each plot, the data was sorted based on the given velocity being varied. For instance in the $C_{13}$: Vp0 plot shown in FIG. 6A, $C_{13}$ is sorted by increasing Vp0.

Shading shows the value of $C_{13}$ in this sensitivity analysis. Therefore, more lateral variation (if it is consistent for the majority of the 450 samples) in each plot means that $C_{13}$ is more sensitive to that specific parameter. The results in this example show that $C_{13}$ is more sensitive to Vp45 than other velocities because $C_{13}$ changes the most when varying Vp45. This can be seen in FIG. 6B where, going from left to right, a much more abrupt change in $C_{13}$ values for Vp45 is observed. This is consistent for almost all 450 samples. $C_{13}$ also has a relatively high sensitivity to Vs0 or $C_{55}$. Although not as apparent, these conclusions can also be drawn from equation (4).

In certain applications, Vp45 is the most problematic velocity to measure for several reasons such as difficulties in sample preparation with exact 45° angle and in some cases ray versus group velocity issues. Adding to the complexity, FIGS. 6A-6D demonstrate that $C_{13}$ can be greatly affected by small errors in Vp45. FIG. 5A-5I shows that those errors in $C_{13}$ can lead to rock elastic properties that are completely different from reality. Therefore, in certain applications unless all the velocities (especially the 45° ones) are measured very precisely, major errors in computing rock elastic properties and anisotropy ($\delta$) characterization may be realized. Problems associated with measurements of Vp45, and consequently $C_{13}$, are sometimes attributed to the group/phase velocity issues, especially when point transducers are used. However, in certain applications, correcting phase to group velocity does not always fix the problem of inaccurate $C_{13}$ measurements.

Bounds of Poisson's Ratios and $C_{13}$

Relationships among VTI Poisson's ratios can be used to define practical upper and lower bounds for $C_{13}$. One exemplary set of upper and lower bounds for $C_{13}$ is shown in inequality (17). The lower bound comes from the fact that: 1) $C_{13}$ must be positive, and 2) $0 < v_{HH} < v_{HV}$. The upper bound comes from $0 < \nu_{HH}$; however, it will be shown here that this not the correct upper bound for $C_{13}$.

$$\sqrt{C_{33}C_{12}C_{66}^2} - C_{66} < C_{13} < \sqrt{C_{33}C_{12}} \quad (17)$$

One reason the upper bound from equation (17) is not correct is that there is a relationship that must hold in VTI media that to date has been overlooked by prior approaches. The missing relationship is shown in inequality (18).

$$\nu_V < \nu_{HH} \quad (18)$$

Figure 7C:
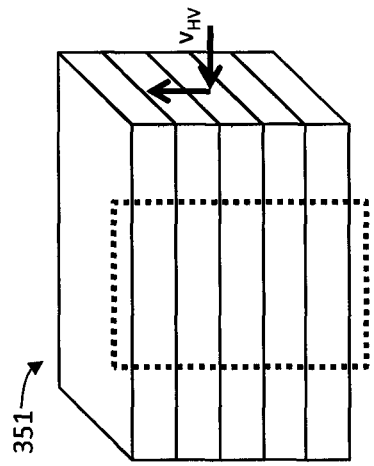
FIGS. 7A-7C are schematic diagrams depicting exemplary Poisson's ratios.
Figure 7B:
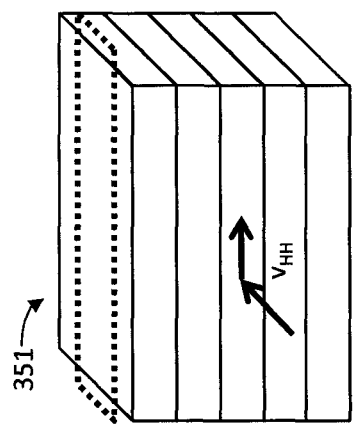
Figure 7A:
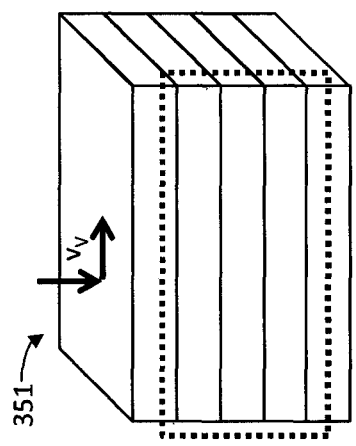

A reason why this relationship exists is hidden in the way the Poisson's ratios are defined as shown in equations (8-11). FIGS. 7A-7C are schematic diagrams of VTI media, which depict how Poisson's ratios are defined and are provided to help demonstrate why the relationship shown in inequality (18) exists.

FIG. 7A depicts a representation of static Poisson's ratio $\nu_V$ in VTI media 351. As shown in FIG. 7A, when computing $\nu_V$, the VTI media 351 is compressed in the vertical direction. VTI media 351 is most compliant in the vertical direction because the planes of weakness make it easier to compress the VTI media 351 in that direction. Hence, a large strain in the vertical direction ($\varepsilon_V$) is experienced. However, the consequent lateral strain ($\varepsilon_H$) is much smaller because the VTI media 351 is stiffer in the horizontal direction and is not expanded much in the horizontal direction due to a stress acting in the vertical direction. Hence, $\varepsilon_V >> \varepsilon_H$. Furthermore, when $\nu_V$ is computed, the vertical strain $E_V$ goes to denominator $$\left(\nu_V = -\frac{\varepsilon_H}{\varepsilon_V}\right),$$

making $\nu_V$ to be very small. This shows that $\nu_V$ should be the smallest Poisson's ratio in VTI rocks. Therefore, what remains in finding out the relationship between the three VTI Poisson's ratios is to determine if $\nu_{HH} < \nu_{HV}$ or $\nu_{HH} > \nu_{HV}$.

FIG. 7B depicts a representation of static Poisson's ratio $\nu_{HH}$ in VTI media 351. When computing $\nu_{HH}$, the VTI media 351 is compressed in the horizontal direction h. h is used as the first horizontal direction to distinguish it from H which is the second horizontal direction. It is important to make this distinction because when the rock is squeezed in h direction, $\varepsilon_h$ and $\varepsilon_H$ will be different; otherwise, $\nu_{HH}=1$, which does not make physical sense. In computing $\nu_{HH}$, the rock is less compliant in the horizontal direction because this time the rock is not pushed against the planes of weakness. Hence, a medium strain in the h direction ($\varepsilon_h$) is observed, and an even smaller (compared to h) strain in the H direction ($\varepsilon_H$) is observed. Hence, $\varepsilon_h >> \varepsilon_H$. When computing $\nu_{HH}$, $\varepsilon_h$ goes to the denominator $$\left(\nu_{HH} = -\frac{\varepsilon_H}{\varepsilon_h}\right),$$

but it is not as big as $\varepsilon_V$ when computing $\nu_V$. Therefore, $\nu_{HH}$ is going to be bigger than $\nu_V$.

FIG. 7C depicts a representation of static Poisson's ratio $\nu_{HV}$ in VTI media 351. When computing $\nu_{HV}$, if the VTI media 351 is squeezed in H direction, $\varepsilon_H$ will be bigger than $E_V$ (to have Poisson's ratio less than 1). However, $E_V$ in this case is relatively large (and goes to the numerator) because of the properties of VTI media, and it is easy to expand them in the vertical direction when squeezing them in the horizontal direction. Therefore, $\nu_{HV}$ should be the biggest Poisson's ratio in a VTI medium, and it becomes clear that $\nu_{HH} < \nu_{HV}$.

In summary, the following relationship should hold for all VTI rocks:

$$0 < \nu_V < \nu_{HH} < \nu_{HV} \quad (19)$$

The newly defined relationship $\nu_V < \nu_{HH}$ provides an opportunity for establishing a practical upper limit of $C_{13}$. This inequality (equation 18) leads to the following inequality:

$$C_{13}^3 + bC_{13}^2 + cC_{13} + d > 0 \quad (20)$$

where coefficients b, c, d can include the stiffness components as follows $$b = -2(C_{11} - C_{66}) \quad (21)$$

$$c = -C_{11}C_{33} \quad (22)$$

$$d = 2C_{33}(C_{11} - C_{66})(C_{11} - 2C_{66}) \quad (23)$$

If inequality (18) is treated as an equation:

$$C_{13}^3 + bC_{13}^2 + cC_{13} + d = 0, \quad (24)$$

Referring now to FIG. 8, to see the behavior of inequality (20), data from a rock sample was taken, and while keeping other $C_{ij}$ unchanged, $C_{13}$ was varied. FIG. 8 is a graph 800 depicting the results of this analysis, which shows inequality (20) plotted as a function of $C_{13}$. The left vertical line 871 is the measured value of $C_{13}$, and the vertical line 873 to the right is the second root of equation (24).

Referring to FIG. 8 as an example, the acceptable range for $C_{13}$ seems to be always between the first and second root of equation (24), and the measured values of $C_{13}$ happen to be always very close to the second root (to the left of the second root). This experiment was repeated on many rock samples and the same behavior was observed.

According to some embodiments, this provides a method for determining a practical upper limit or estimating a value for $C_{13}$ based on equation (24). For example, the three roots of cubic function (24) can be solved using, among other methods, the trigonometric method. The general solution has the form:

$$t_k = 2\sqrt{-\frac{p}{3}} \cos\left(\frac{1}{3}\cos^{-1}\left(\frac{3q}{2p}\sqrt{-\frac{3}{p}}\right) - \frac{2\pi k}{3}\right) \text{ for } k = 0, 1, 2 \quad (25)$$

where $$p = \frac{3ac - b^2}{3a^2} \quad (26)$$

$$q = \frac{2b^3 - 9abc + 27a^2d}{27a^3} \quad (27)$$

Solutions are:

$$C_{13} = t_k - \frac{b}{3a} \quad (28)$$

The acceptable upper limit of $C_{13}$ as mentioned before, always happens to be to the left of the second root (k=1); therefore, a practical upper limit of $C_{13}$ can be defined as:

$$C_{13}^U = t_1 - \frac{b}{3a} \quad (29)$$

As discussed before, the lower bound for $C_{13}$ can be based on equation (17); therefore, a practical lower limit of $C_{13}$ can be defined as:

$$C_{13}{}^L = C_{33}C_{12} + C_{66}{}^2 - C_{66} \qquad (30)$$

FIG. 9 depicts an exemplary graph 900 in which these bounds for $C_{13}$ are determined for the exemplary data set from FIGS. 5A-5I corresponding to one rock sample. In FIG. 9, the determined bounds are plotted along with measured values of $C_{13}$. In FIG. 9, curve 947 shows the measured $C_{13}$ values from the data set. Curve 949 is the lower bound computed using equation (30) and curve 943 is the newly defined upper bound computed using equation (29). Curve 941 is the upper bound defined in equation (17). As can be seen in FIG. 9, all $C_{13}$ measurements in this example except for one (the 15$^{th}$ data point) fall within the bounds 943 and 949 defined in equations (29 and 30). Advantageously, the upper and lower bounds (curves 943 and 949) are very close to each other. Therefore, this provides an alternative method for estimating $C_{13}$ (and other properties such as δ) by simply averaging the upper and lower bounds, which does not need Vp45 measurements. This average is represented by the following equation:

$$C_{13} = \frac{C_{13}^L + C_{13}^U}{2} \qquad (31)$$

In some embodiments, this method of estimating $C_{13}$ is used only if the measured $C_{13}$ (e.g., computed from Vp45 using equation 4) is not within the defined bounds (equations 29 and 30). According to at least some embodiments disclosed herein, a method for quality controlling the $C_{13}$ computations can additionally or alternatively be used as method for estimating $C_{13}$, without the need to measure Vp45 and use equation (4). For example, the new upper bound corresponding to equation (29) can provide a metric for quality controlling the measured $C_{13}$ (computed from Vp45 using equation 4), and the same upper bound can additionally or alternatively be used to estimate $C_{13}$ without using the measured Vp45 for computing the estimate using equation (31).

Results and Applications

FIG. 10 is a graph 1000 containing an exemplary bar plot to show accuracies of estimating $C_{13}$ using equation (31). The graph 1000 is based on the approximately 450 rock samples from the data used in FIGS. 6A-6D. To generate the graph 1000, $C_{13}$ was estimated using equation (31) for each of the approximately 450 rock samples. Each bar corresponds to a given accuracy of the estimated $C_{13}$ compared to the measured value from the data set, while the height of each bar shows the number of data points (i.e., number of estimated $C_{13}$ values) having the given accuracy. As can be seen in FIG. 10, an accuracy of ±0.5 GPa is observed for 135 out of the approximately 450 rock samples, an accuracy of ±1 GPa is observed for 100 samples, an accuracy of ±1.5 GPa is observed for 125 samples, and an accuracy of ±2 GPa is observed for 40 samples. Thus, in this example, $C_{13}$ can be estimated by averaging the bounds with an accuracy of ±2 GPa for 90% of the data and ±1.5 GPa for 80% of the data.

FIGS. 11A-11I depict another exemplary set of graphs 1100a-i based on Monte Carlo simulation. The graphs 1100a-i demonstrate how estimation of $C_{13}$ by averaging bounds, as described above, can provide a method that is robust to errors in velocities. In particular, the graphs 1100a-i show determined $C_{13}$, δ and mechanical property values that are less scattered than what is shown in FIGS. 5A-5I.

The results shown in FIGS. 11E-11I are based on the same inputs as those used in FIGS. 5E-5I. Thus, graphs 1100a-100d shown in FIGS. 11A-11D contain bar plots that are the same as graphs 500a-500d shown in FIGS. 5A-5D. Horizontal bars 1190a-d show the same measured velocity values as horizontal bars 590a-d in FIGS. 5A-5D. The same 100 noisy values for each velocity, with added maximum noise equal to 1% of each velocity magnitude, are shown as vertical bars in FIGS. 11A-11D and are taken as inputs for the analysis.

In FIGS. 11E, equation (31) was used to estimate $C_{13}$ for each of the 100 permutations. In FIGS. 11F-11I, equations (7, 12, 13 and 14) were used to compute 6 and VTI Poisson's ratios for each of the 100 permutations, based on the estimated $C_{13}$ values from FIG. 11E. The expected values based on the data for $C_{13}$, δ and VTI Poisson's ratios are shown as horizontal bars 1190e-1190i. As can be seen in FIGS. 11E-11I, more robust computation results for all properties is observed. Although not shown in FIGS. 11A-11I, the same behavior (more robust computation results using equation 31) was observed for other data from different rock samples.

To further investigate the performance of the above exemplary averaging method ("avg. method" in Table 1), it was compared to a number of other methods. The data from the same rock sample from FIGS. 5A-5I was used as a benchmark. $C_{13}$, δ, and dynamic Poisson's ratios measured from that data are assumed to be the correct values.

One of the methods ("1$^{st}$ alt. method" in Table 1) that was used for comparison, comes from linear slip theory where $C_{13}$ can be computed by solving the equation (32).

$$C_{11}C_{33} - C_{13}{}^2 = 2C_{66}(C_{33} + C_{13}) \qquad (32)$$

The next method ("2$^{nd}$ alt. method" in Table 1) is a recent empirical method for estimating $C_{13}$. In addition, the so-called Modified ANNIE ("3$^{rd}$ alt. method" in Table 1) was used for comparison. After computing $C_{13}$ using these methods, δ, and Poisson's ratios were also computed. Performance statistics for $C_{13}$ and δ are given in Table 1. As can be seen in the performance statistics, the averaging method shows better performance than the other methods in predicting all of the parameters. The same performance is seen for Poisson's ratios.

TABLE 1

| | Correlation coefficient and root mean square (RMS) errors in predicting $C_{13}$ and δ. | | | |
|---|---|---|---|---|
| | Δ | | $C_{13}$ | |
| | Correlation Coefficient | RMS Error | Correlation Coefficient | RMS Error |
| avg. method | 0.9648 | 0.0289 | 0.9958 | 0.9668 |
| 1$^{st}$ alt. method | 0.8749 | 0.0898 | 0.9916 | 2.9604 |
| 2$^{nd}$ alt. method | 0.6780 | 0.0867 | 0.9418 | 3.2092 |
| 3$^{rd}$ alt. method | 0.8464 | 0.01594 | 0.9306 | 3.6264 |

FIGS. 12A-12F depict another exemplary set of graphs 1200a-1200f. In this example, data from the same 450 rock samples used in FIGS. 6A-6D was corrected using equation (31) whenever the measured $C_{13}$ fell outside the bounds given in equations (29 and 30). Therefore for those data points, in addition to $C_{13}$, δ and Poisson's ratios were also recomputed. This correction however did not affect Thomsen parameters ε and γ because $C_{13}$ is not used in their definition. Data for rock samples that followed the bounds in equations (29 and 30) were untouched in this experiment.

The results of this analysis before correction are shown in graphs 1200a-c in FIGS. 12A-12C, and the results after correction are shown in graphs 1200d-f in FIGS. 12D-12F. For all of the depicted plots, shading shows the value of Thomsen ε data, which was not altered by the correction. As can be seen in FIG. 12B, the fact that $v_{HV}$ has the highest value among VTI Poisson's ratios and $v_V$ has the lowest values (implying $v_V \ll v_{HV}$) is so pronounced that it can be seen in the data without any correction. As can be seen in FIGS. 12A, 12C, 12D, and 12F, the other relationships shown in inequality (19) are not observed in the data before correction, but are brought to the data after doing the correction. One observation is the fact that after correction, data from nearly isotropic rocks (dark shading corresponding to very small E values) are lined up along the one to one line (isotropic line), and as the anisotropy increases, data starts to deviate from the one to one line.

An effect of this correction is on δ, which reveals a fundamental physical phenomenon that was hidden before because of measurement errors and problems associated with 45° measurements. FIGS. 13A-13F depict another exemplary set of graphs 1300a-f. In this example, data from the same 450 rock samples used in FIGS. 6A-6D was corrected using equation (31) whenever the measured $C_{13}$ fell outside the bounds given in equations (29 and 30), and Thomsen parameters for the data were determined. The results of this analysis before correction are shown in graphs 1300a-c in FIGS. 13A-13C, and the results after correction are shown in graphs 1300d-f in FIGS. 13D-13F. In FIGS. 13A and 13D, the shading in the ε versus δ graphs 1300a and 1300d indicates γ values. In FIGS. 13B and 13E, the shading in the γ versus δ graphs 1300b and 1300e indicates ε values. In FIGS. 13C and 13F, the shading in the γ versus ε graphs 1300c and 1300f indicates δ values.

As shown in FIGS. 13A-13F, after correction, δ is positively correlated to ε, and negatively correlated to γ. Another way to interpret the relationship among ε, γ, and δ, is to say, for instance, for a constant value of γ, ε and δ have a linear relationship. Alternatively, for a constant value of δ, ε and γ have a linear relationship. This relationship between ε, γ, and δ provides an opportunity to for instance, estimate δ from ε and γ using a regression analysis.

FIG. 14 depicts a graph 1400 showing results of an exemplary linear regression analysis, using again the same data that was used in FIGS. 6A-6D. In this example, ε, γ, and the corrected δ values are utilized in a linear regression analysis. A relationship of the form shown below is obtained $$\delta = a_0 + a_1 \varepsilon + a_2 \gamma \quad (33)$$

where $a_0 = -0.003282$; $a_1 = 1.527$ and $a_2 = -1.075$. Ignoring the small intercept, this relationship can be written in the following form $$\delta = 1.5\varepsilon - \gamma \quad (34),$$

suggesting that ε has more contribution to estimating δ than γ. In FIG. 14, equation (34) was used to estimate the δ value from ε and γ. The estimation results are plotted against the corrected δ in FIG. 14, showing close correlation between the two sets of values.

FIG. 15 is a flow chart depicting an example method 1500 for determining mechanical properties of an anisotropic media, according to some embodiments. The method 1500 may employ various principles described above. The method 1500 depicts an example of how determination of mechanical properties may be applied in the context of a drilling system or other well system and used to facilitate operations in a formation that includes anisotropic media. One or more of the steps shown in the figure may involve processing operations implemented by one or more processors of a processing system, such as, for example, computing facilities 208 (FIG. 1B). In some embodiments, the method 1500 may involve direct or indirect interactions with the subject anisotropic media, using, for example, one or more tools of a well system, such as drilling system 100 (FIG. 1A) or wireline system 200 (FIG. 1B).

It will be appreciated that a processing system may be configured to implement any of the methods described herein using programming in hardware, software, or a combination of hardware and software. For example, in some software embodiments a non-transitory computer readable medium may contain instructions that, when executed by the processor, cause the processing system to implement one or more steps of the methods disclosed herein. By way of example, the non-transitory computer readable storage medium may include disk drives, flash memory, optical discs, static RAM (SRAM), dynamic RAM (DRAM), and/or other volatile and/or non-volatile memories. By way of example, the processor may include one or more microprocessors, microcontrollers, application specific integrated circuits (ASICs), field programmable gate arrays (FPGAs), digital logic circuit blocks, and/or other appropriate processing circuitry that may be implemented in one or more integrated circuits.

Referring now to FIG. 15, a method 1500 is depicted that involves determining an upper bound for the stiffness component $C_{13}$ based on other stiffness components that may not use off-axis measurements. The upper bound may then be used to estimate a value for $C_{13}$ without a need for the off-axis measurements.

The method 1500 may generally include obtaining measurement data of an anisotropic media. More particularly, as shown in FIG. 15, the method 1500 may include obtaining log data at 210 corresponding to measurements of the anisotropic media collected with one or more logging tools, e.g., the logging tool(s) 126 (see FIGS. 1A-2). The anisotropic media may form or otherwise be a part of a formation to be evaluated for a drilling operation or other well operation, such as, for example, subterranean formation 106 (see FIGS. 1A-1B). In various embodiments, the anisotropic media may include layering, lamination, bedding, and/or fractures, for example.

In some embodiments, the log data may be obtained by collecting measurements in real-time, for example, by collecting the data using real-time measurements with the logging tool(s) and transmitting them for further processing. Alternatively, all or a portion of the log data obtained at 210 may correspond to data that was collected separately. In either case, raw data from the measurements of the anisotropic media may be input to, received by, or otherwise obtained by a processing system for further data processing operations. In some embodiments, the measurements may include wave velocity measurements (or "slowness measurements") for waves propagating in the anisotropic media. The wave velocity measurements may be obtained, for example, by transmitting waves through the formation with one or more transmitters of a sonic logging tool and receiving corresponding waves with one or more receivers of the sonic logging tool to measure a corresponding response.

According to various embodiments, velocities or velocity measurements may be obtained or otherwise determined for waves propagating in multiple different directions. A "horizontal velocity" or "horizontal velocity measurement" may correspond to waves propagating in a horizontal direction relative to an axis of symmetry of an anisotropic media (e.g., perpendicular to the symmetry axis). A "vertical velocity" or "vertical velocity measurement" may correspond to waves propagating in a vertical direction relative to the axis of symmetry of the anisotropic media (e.g., parallel to the symmetry axis). An "off-axis velocity" or "off-axis measurement" may correspond to waves propagating in an off-axis direction (or oblique direction) relative to the axis of symmetry of the anisotropic media (e.g., between 0 and 90 degrees relative to the symmetry axis). The off-axis direction may be considered off-axis in that it is aligned with neither the horizontal nor vertical axes corresponding to the horizontal and vertical directions. In some embodiments, the off-axis measurements correspond to a 45 degree angle relative to the axis of symmetry of the anisotropic media. Additionally or alternatively, another off-axis direction between 0 and 90 degrees may be used for the off-axis measurement(s).

At 212, the method 1500 includes determining values for a plurality of stiffness components. In particular, as shown in FIG. 15, values for stiffness component $C_{11}$, $C_{33}$, $C_{55}$ and $C_{66}$ of a stiffness matrix $C_{ij}$ may be determined based on vertical velocities and horizontal velocities measured or otherwise derived from the log data, and more particularly, for example, based on vertical velocities and horizontal velocities involving compressional waves and shear waves.

In general, each of the stiffness components determined at 212 may be based directly or indirectly on the velocities derived from the log data. For example, in some embodiments a measured vertical propagating compressional velocity (Vp0) from the log data can provide a value for stiffness component $C_{33}$ directly, and a measured vertically polarized shear velocity (Vs0) from the log data can provide a value for stiffness component $C_{55}$ directly. A horizontally polarized shear velocity (Vs90) can then be estimated from analysis of full-waveform sonic data, including Stoneley waveform data and possibly including dipole waveform data, along with other parameters. Stiffness component $C_{66}$ is then directly computed from Vs90. With knowledge of Vs0 and Vs90, one can get one parameter, γ, and if one decides that ε (P-wave anisotropy) is related to γ (e.g., ε=γ), then one can in turn estimate the horizontal propagating compressional velocity Vp90, which can provide stiffness component $C_{11}$. It will be understood that these methods are merely exemplary, and in various embodiments, any suitable methods for determining the velocities or stiffness components from the log data may be used, as appropriate.

Referring again to FIG. 15, at 220, an upper bound for the stiffness component $C_{13}$ is determined based on one or more of the stiffness components determined at 212. More particularly, as shown in FIG. 15, both upper and lower bounds may be determined at 220, which may be used to estimate a value of $C_{13}$ without a need for using off-axis measurements for the estimate, as described herein. For example, in some embodiments the upper bound may be determined based on determining a root of a cubic equation having stiffness components from 212 included in the coefficients of the cubic function. More particularly, the upper bound $C_{13}^{U}$ (or "upper limit") may be determined based on equation (29) above. In some embodiments, the lower bound (or "lower limit") may be determined based on equation (30) above. Alternatively, while desirable results are shown above for the upper bound based on equation (29), in other embodiments any other suitable methods may be used for determining the upper and/or lower bounds, as appropriate.

At 232, a value of the stiffness component $C_{13}$ is estimated based on the determined upper bound. In particular, the value may be estimated at 232 by averaging upper and lower bounds, e.g., based on equation (29) above. Alternatively, while desirable results are shown above for the estimate based on averaging the upper and lower bounds, in other embodiments any other suitable method for estimating $C_{13}$ may be used at 232. For example, other suitable methods for estimating the value for stiffness component based on the upper and/or lower bounds, and/or based on the other stiffness components (e.g., $C_{11}$, $C_{33}$, $C_{55}$ and/or $C_{66}$) may be used.

At 236, one or more mechanical properties of the anisotropic media are determined based on the estimated value of the stiffness component $C_{13}$. In particular, the mechanical property may be determined based on the stiffness component $C_{13}$ and other parameters (e.g., $C_{11}$, $C_{33}$, $C_{55}$, $C_{66}$) of the stiffness matrix $C_{ij}$. Any one or more of a variety of mechanical properties may be computed at this stage. For example, one or more values of one or more Poisson's ratios $v_{ij}$ may be computed, e.g., based on one or more of equations (12)-(14). Additionally or alternatively, one or more values of one or more Young's moduli E may be computed, e.g., based on one or more of equations (15)-(16). Additionally or alternatively, one or more values of a fracture gradient may be computed, e.g., based on a Poisson's ratio and/or a Young's moduli. Additionally or alternatively, one or more values of a minimum and/or maximum horizontal stress may be computed, e.g., based on a Poisson's ratio and/or a Young's moduli. Additionally or alternatively, one or more other $C_{13}$-dependent mechanical properties may be computed at 236. The mechanical property or properties may then be provided for use in controlling an operating parameter of a drilling system or other well system.

According to some embodiments, at 240, an operating parameter for a well system, such as drilling system 100 (see FIG. 1A), is controlled based on the mechanical property from 236. For example, the processing system may be configured to generate one or more control signals for driving a tool of the drilling system based on the computed mechanical property, or an operator may otherwise control an operating parameter of the drilling system based on the mechanical property. In some embodiments a spot (e.g., a "sweet spot" or location) to drill a horizontal well may be determined at 240. Additionally or alternatively, an interval to perforate in a well may be determined based on the mechanical property at 240. Additionally or alternatively, a fracturing pressure for fracturing the formation may be determined based on the mechanical property (and further based on a depth of the formation, for example). Additionally or alternatively, one or more other operating parameters of a drilling system may be determined at 240 that may be influenced by a mechanical property of an anisotropic media.

One or more operations may then be performed in accordance with the operating parameter from 240 using a tool of a well system. The one or more operations may involve interacting with the anisotropic media directly or indirectly with a tool. For example, in some embodiments a horizontal well may be drilled using a drill bit or other drilling tool of a drilling system. Additionally or alternatively, an interval may be perforated in a casing or liner of an oil well using a perforation gun or other perforation tool. Additionally or alternatively, a formation may be fractured using a hydraulic tool or other fracturing tool according to a fracture pressure determined based on the mechanical property.

While FIG. 15 depicts a method for estimating $C_{13}$ based on upper and lower bounds determined from log data, in some embodiments, the upper and lower bounds may additionally or alternatively be used for quality controlling measured values of $C_{13}$.

For example, in some embodiments the measurement data may additionally or alternatively include core data, corresponding to measurements of one or more samples of the anisotropic media extracted with one or more coring tools. The core data may be obtained, for example, by extracting one or more samples of the anisotropic media with one or more coring tools, and performing further laboratory analysis or measurements of the extracted core sample(s). In various embodiments, any suitable coring tool may be used. For example, in some embodiments, the coring tool may include or otherwise be implemented as a coring drill bit employed in the drill bit 118 (FIG. 1).

A measured value of $C_{13}$ may be determined based on an off-axis velocity from the core data (e.g., 45 degree compressional wave velocity Vp45). The measured value of $C_{13}$ may then be compared to upper and lower bounds as a quality check. The upper and lower bounds may be determined based on horizontal and vertical velocities from the core data or other measurement data, in a similar manner as described above. When the measured value of $C_{13}$ falls within the upper and lower bounds, the measured value of $C_{13}$ may be deemed to be reliable and used for further downstream processing, e.g., to compute one or more mechanical properties useful for controlling operating parameters of a well system in a similar fashion as is described above. Alternatively, when the measured value of $C_{13}$ falls outside of the upper and lower bounds, the measured value may be corrected, e.g., using an estimate based on other stiffness components of horizontal/vertical velocities as described above.

Test results show that methods described herein for predicting mechanical properties of rocks outperform other methods. This is shown, for example, in Table 1. This work also provides the only method for doing dynamic to static correction of mechanical properties for anisotropic (e.g., TI, VTI, HTI) media. Other methods may only be suitable for isotropic Young's moduli. In this disclosure, a more comprehensive correction is proposed which corrects horizontal and vertical Young's moduli and 3 Poisson's ratios which are useful for computing fracture gradient, and/or horizontal stresses. This disclosure also revealed a relationship between Thomsen anisotropy parameters, which are widely used for seismic, geomechanics and drilling applications. This provided a way for predicting or estimating Thomsen delta. Advantageously, methods described herein can be utilized to determine mechanical properties for formation evaluation and sweet spot picking, determining a stiffness matrix for computing stresses and fracture gradient, identifying Thomsen delta for seismic imaging, identifying mechanical properties and anisotropy parameters for mud weight calculation, wellbore stability, and other parameters.

Predicting the correct values of Poisson's ratios and Young's moduli, which can be used for computing fracture gradient and minimum horizontal stress, is useful for geomechanics, hydraulic fracturing and completion. For unconventionals, methods described herein can be utilized and may be of greater value than predicting porosity, saturation and kerogen volume. Elastic moduli profiles can be used to predict rock brittleness and/or determine a profile of stress versus depth to aid in selecting "sweet spots" to drill a horizontal well, and also to determine intervals to perforate.

Illustration of Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A method for determining mechanical properties of an anisotropic media, the method comprising: obtaining log data of the anisotropic media, the log data corresponding to measurements of the anisotropic media collected with a logging tool; determining values for a plurality of first stiffness components of a stiffness matrix based on horizontal and vertical velocities derived from the log data; determining an upper bound for a second stiffness component of the stiffness matrix based on the values for the plurality of first stiffness components; estimating a value for the second stiffness component based on the determined upper bound; determining a mechanical property of the anisotropic media based on the estimated value of the second stiffness component; and providing the determined mechanical property.

Clause 2. A system for determining mechanical properties of an anisotropic media, the system comprising: a logging tool configured to collect measurements of the anisotropic media; and a processing system having a processor and a memory, the processing system configured to: obtain log data of the anisotropic media from the logging tool, the log data corresponding to the measurements of the anisotropic media; determine values for a plurality of first stiffness components of a stiffness matrix based on horizontal and vertical velocities derived from the log data; determine an upper bound for a second stiffness component of the stiffness matrix based on the values for the plurality of first stiffness components; estimate a value for the second stiffness component based on the determined upper bound; and determine a mechanical property of the anisotropic media based on the estimated value of the second stiffness component.

Clause 3. A non-transitory computer readable medium storing instructions that, when executed, cause a processing system to perform a method for determining mechanical properties of an anisotropic media, the method comprising: obtaining log data of the anisotropic media, the log data corresponding to measurements of the anisotropic media collected with a logging tool; determining values for a plurality of first stiffness components of a stiffness matrix based on horizontal and vertical velocities derived from the log data; determining an upper bound for a second stiffness component of the stiffness matrix based on the values for the plurality of first stiffness components; estimating a value for the second stiffness component based on the determined upper bound; determining a mechanical property of the anisotropic media based on the estimated value of the second stiffness component; and providing the determined mechanical property.

Clause 4. A method for determining mechanical properties of an anisotropic media, the method comprising: obtaining measurement data of the anisotropic media; determining values for a plurality of first stiffness components of a stiffness matrix based on horizontal and vertical velocities derived from the measurement data; determining a measured value for a second stiffness component of the stiffness matrix based on an off-axis velocity derived from the measurement data; determining an upper bound and a lower bound for the second stiffness component based on the values for the plurality of first stiffness components; comparing the measured value for the second stiffness component to the determined upper bound and lower bound for the second stiffness component; determining a mechanical property of the anisotropic media based on the measured value of the second stiffness component when the measured value is determined to fall within the upper bound and the lower bound; and providing the determined mechanical property.

Clause 5. A system for computing mechanical properties of an anisotropic media, the system comprising: a coring tool configured to collect a sample of the anisotropic media; and a processing system having a processor and a memory, the processing system configured to: obtain core data of the anisotropic media corresponding to the sample collected with the coring tool; determine values for a plurality of first stiffness components of a stiffness matrix based on horizontal and vertical velocities; determine a measured value for a second stiffness component of the stiffness matrix based on an off-axis velocity derived from the core data; determine an upper bound and a lower bound for the second stiffness component based on the values for the plurality of first stiffness components; compare the measured value for the second stiffness component to the determined upper bound and lower bound for the second stiffness component; determine a mechanical property of the anisotropic media based on the measured value of the second stiffness component when the measured value is determined to fall within the upper bound and the lower bound; and provide the determined mechanical property.

Clause 6. A non-transitory computer readable medium storing instructions that, when executed, cause a processing system to perform a method for determining mechanical properties of an anisotropic media, the method comprising: obtaining measurement data of the anisotropic media; determining values for a plurality of first stiffness components of a stiffness matrix based on horizontal and vertical velocities derived from the measurement data; determining a measured value for a second stiffness component of the stiffness matrix based on an off-axis velocity derived from the measurement data; determining an upper bound and a lower bound for the second stiffness component based on the values for the plurality of first stiffness components; comparing the measured value for the second stiffness component to the determined upper bound and lower bound for the second stiffness component; determining a mechanical property of the anisotropic media based on the measured value of the second stiffness component when the measured value is determined to fall within the upper bound and the lower bound; and providing the determined mechanical property.

Clause 7. According to any of Clauses 1-6, wherein the determined mechanical property includes a Poisson's ratio, wherein a fracture pressure is configured to be determined based on the Poisson's ratio.

Clause 8. According to any of Clauses 1-3, wherein the log data is configured to be collected by transmitting a plurality of waves in the anisotropic media and measuring a corresponding response, wherein the plurality of waves involve a plurality of different propagation directions and a plurality of different propagation modes.

Clause 9. According to any of Clauses 1-3, 7, or 8, wherein the logging tool is configured to be disposed downhole in a wellbore, wherein the logging tool comprises one or more transmitters configured to transmit a plurality of waves and one or more receivers configured to measure a corresponding response, wherein the one or more transmitters are spaced apart axially from the one or more receivers.

Clause 10. According to any of Clauses 1-3 or 7-9, wherein one or more transmitters are configured to transmit acoustic waves, wherein one or more receivers are configured to measure the corresponding response after the transmitted acoustic waves interact with the anisotropic media, and wherein the log data includes acoustic waveform data.

Clause 11. According to any of Clauses 1-10, wherein the upper bound is configured to be determined based on a root of a cubic function, wherein the plurality of first stiffness components are included in coefficients of the cubic function.

Clause 12. According to any of Clauses 1-11, wherein the plurality of first stiffness components correspond to $C_{11}$, $C_{33}$, $C_{55}$, and $C_{66}$ components of the stiffness matrix, and wherein the second stiffness component corresponds to a $C_{13}$ component of the stiffness matrix.

Clause 13. According to any of Clauses 1-12, wherein the upper bound is configured to be determined based on $$C_{13}^U = t_1 - \frac{b}{3a},$$

where: $C_{13}^U$ is the upper bound, $b=-2(C_{11}-C_{66})$, $c=-C_{11}C_{33}$, $d=2C_{33}(C_{11}-C_{66})(C_{11}-2C_{66})$, and $t_1$ is the second root of $C_{13}^3+bC_{13}^2+cC_{13}+d=0$.

Clause 14. According to any of Clauses 1-13, wherein the value of the second stiffness component is configured to be estimated based on an average of the upper bound and a lower bound for the second stiffness component.

Clause 15. According to any of Clauses 1-3 or 7-14, wherein the logging tool comprises: one or more transmitters configured to transmit a plurality of waves in the anisotropic media, the plurality of waves being configured to involve a plurality of different propagation directions and a plurality of different propagation modes; and one or more receivers spaced apart axially from the one or more transmitters and configured to measure a corresponding response to the transmitted plurality of waves.

Clause 16. According to any of Clauses 4-7, wherein the measurement data is configured to include core data corresponding to a sample of the anisotropic media obtained with a coring tool, and wherein the off-axis velocity is derived from the core data.

Clause 17. According to any of Clauses 4-7, 11-14, or 16, wherein the core data is configured to be collected by extracting the sample with the coring tool and measuring the extracted sample.

Clause 18. A method for computing mechanical properties of an anisotropic media, the method comprising: estimating a $C_{13}$ value; and computing a mechanical property of the anisotropic media using the estimated $C_{13}$ value.

Clause 19. According to any of Clauses 1-18, wherein the mechanical property is a Young's modulus, a shear modulus, a Poisson's ratio, a Thomsen anisotropy parameter δ, a horizontal stress, or a fracture gradient.

Clause 20. According to any of Clauses 1-19, wherein the anisotropic media comprises a vertically transverse isotropic media, a horizontally transverse isotropic media, a tilted transverse isotropic media, an orthorhombic media, or an orthotropic media.

This disclosure introduces an improved technique for computing mechanical properties (Young's and shear moduli, Poisson's ratios), Thomsen anisotropy parameters δ, $C_{13}$, and any other parameter that uses $C_{13}$ as an input, in anisotropic media such as VTI, HTI and TTI. This disclosure introduces methods that use only the vertical and horizontal velocities (slownesses) to estimate certain mechanical properties and do not require 45 degree or any other off-axes measurements. This disclosure introduces a way for correcting data where 45 degree or any off-axes measurements are not acquired or cannot be acquired with high precision. This disclosure defines new relationships between Poisson's ratios for VTI, HTI, TTI, orthotropic, and orthorhombic (equations 18 and 19 FIG. 10) which leads to a new upper bound for $C_{13}$ (equations 20-29). This disclosure proposes a method for estimating $C_{13}$ by averaging the upper and lower bounds of $C_{13}$ (equation 31). This disclosure allows for computing improved Thomsen δ, TI Poisson's ratios and Young's moduli and any other mechanical properties such as horizontal stresses, fracture gradients, and other mechanical properties in anisotropic media. This disclosure allows for dynamic to static correction of Poisson's ratios in anisotropic media. A new relationship between Thomsen δ with other parameters ε and γ is defined (equations 33 and 34). A new empirical relationship for dynamic to static correction of anisotropic Young's moduli is proposed (equation 35).

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method comprising:
utilizing a non-transitory computer readable medium for storing instructions that, when executed, cause a processing system to perform a method for determining one or more mechanical properties of an anisotropic media, the method comprising:
obtaining log data of the anisotropic media, the log data corresponding to measurements of the anisotropic media collected with logging tool;
determining values for a plurality of first stiffness components of a stiffness matrix based on horizontal and vertical velocities derived from the log data;
determining an upper bound for a second stiffness component of the stiffness matrix based on the values for the plurality of first stiffness components;
estimating a value for the second stiffness component based on the upper bound, wherein the estimating the value for the second stiffness component is not based on a one or more off-axis angle measurements;
determining a mechanical property of the anisotropic media based on the value of the second stiffness component; and
providing the mechanical property; and
utilizing the mechanical property to control an operating parameter of a drilling system or well system.

2. The method of claim 1, wherein the plurality of first stiffness components correspond to $C_{11}$, $C_{33}$, $C_{55}$, and $C_{66}$ components of the stiffness matrix, and wherein the second stiffness component corresponds to a $C_{13}$ component of the stiffness matrix.

3. The method of claim 2, wherein the upper bound is determined based on $$C_{13}^U = t_1 - \frac{b}{3a},$$

where: $C_{13}^U$ is the upper bound, $b=-2(C_{11}-C_{66})$, $c=-C_{11}C_{33}$, $d=2C_{33}(C_{11}-C_{66})(C_{11}-2C_{66})$, and $t_1$ is the second root of $C_{13}^3+bC_{13}^2+cC_{13}+d=0$.

4. The method of claim 1, further comprising estimating the value of the second stiffness component based on an average of the upper bound and a lower bound for the second stiffness component.

5. The method of claim 1, wherein the determining the mechanical property comprises determining a Poisson's ratio and wherein the method further comprises determining a fracture pressure based on the Poisson's ratio.

6. The method of claim 1, further comprising collecting the log data from a plurality of transmitted waves in the anisotropic media and measuring a corresponding response.

7. The method of claim 6, wherein the plurality of transmitted waves involve a plurality of different propagation directions and a plurality of different propagation modes.

8. The method of claim 7, wherein the plurality of transmitted waves are acoustic waves.

9. The method of claim 1, wherein the upper bound is determined based on a root of a cubic function, wherein the plurality of first stiffness components are included in coefficients of the cubic function.

10. A method for determining mechanical properties of an anisotropic media, the method comprising:
extracting a sample of the anisotropic media with a coring tool, wherein the coring tool is disposed in a wellbore;
obtaining measurement data of the anisotropic media from the sample;
determining values for a plurality of first stiffness components of a stiffness matrix based on horizontal and vertical velocities derived from the measurement data;
determining a measured value for a second stiffness component of the stiffness matrix based on an off-axis velocity derived from the measurement data;
determining an upper bound and a lower bound for the second stiffness component based on the values for the plurality of first stiffness components;
comparing the measured value for the second stiffness component to the upper bound and lower bound for the second stiffness component;
determining a mechanical property of the anisotropic media based on the measured value of the second stiffness component when the measured value is determined to fall within the upper bound and the lower bound; and
providing the mechanical property.

11. The method of claim 10, wherein the determining the mechanical property comprises determining a Poisson's ratio and wherein the method further comprises determining a fracture pressure based on the Poisson's ratio.

12. The method of claim 10, wherein the measurement data includes core data corresponding to the sample of the anisotropic media obtained with the coring tool and wherein the off-axis velocity is derived from the core data.

13. The method of claim 10, wherein the upper bound is determined based on a root of a cubic function and wherein the plurality of first stiffness components are included in coefficients of the cubic function.

14. The method of claim 10, wherein the plurality of first stiffness components correspond to $C_{11}$, $C_{33}$, $C_{55}$, and $C_{66}$ components of the stiffness matrix and wherein the second stiffness component corresponds to a $C_{13}$ component of the stiffness matrix.

15. The method of claim 10, wherein the upper bound is determined based on $$C_{13}^U = t_1 - \frac{b}{3a},$$

where: $C_{13}^U$ is the upper bound, $b=-2(C_{11}-C_{66})$, $c=-C_{11}C_{33}$, $d=2C_{33}(C_{11}-C_{66})(C_{11}-2C_{66})$, and $t_1$ is the second root of $C_{13}^3+bC_{13}^2+cC_{13}+d=0$.

16. A system for computing mechanical properties of an anisotropic media, the system comprising:
a coring tool to collect a sample of the anisotropic media; and
a processing system having a processor and a memory, wherein the processing system:
obtains core data of the anisotropic media corresponding to the sample collected with the coring tool;
determines values for a plurality of first stiffness components of a stiffness matrix based on horizontal and vertical velocities;
determines a measured value for a second stiffness component of the stiffness matrix based on an off-axis velocity derived from the core data;
determines an upper bound and a lower bound for the second stiffness component based on the values for the plurality of first stiffness components;

compares the measured value for the second stiffness component to the upper bound and lower bound for the second stiffness component;

determines a mechanical property of the anisotropic media based on the measured value of the second stiffness component when the measured value is determined to fall within the upper bound and the lower bound; and provides the mechanical property.

17. The system of claim 16, wherein the upper bound is determined based on a root of a cubic function, wherein the plurality of first stiffness components are included in coefficients of the cubic function.

18. The system of claim 16, wherein the plurality of first stiffness components correspond to $C_{11}$, $C_{33}$, $C_{55}$, and $C_{66}$ components of the stiffness matrix, and wherein the second stiffness component corresponds to a $C_{13}$ component of the stiffness matrix.

19. The system of claim 16, wherein processing system determines the upper bound based on:

$$C_{13}^{U} = t_1 - \frac{b}{3a},$$

where: $C_{13}^{U}$ is the upper bound, $b=-2(C_{11}-C_{66})$, $c=-C_{11}C_{33}$, $d=2C_{33}(C_{11}-C_{66})(C_{11}-2C_{66})$, and $t_1$ is the second root of $C_{13}^3+bC_{13}^2+cC_{13}+d=0$.

20. The system of claim 16, wherein the processing system further: estimates the value of the second stiffness component based on an average of the upper bound and the lower bound for the second stiffness component.

\* \* \* \* \*